United States Patent
Kitazato

(10) Patent No.: US 8,204,366 B2
(45) Date of Patent: Jun. 19, 2012

(54) METHOD, APPARATUS AND PROGRAM FOR RECORDING AND PLAYING BACK CONTENT DATA, METHOD, APPARATUS AND PROGRAM FOR PLAYING BACK CONTENT DATA, AND METHOD, APPARATUS AND PROGRAM FOR RECORDING CONTENT DATA

(75) Inventor: Naohisa Kitazato, Tokyo (JP)

(73) Assignee: Sony Corporation, Tokyo (JP)

( * ) Notice: Subject to any disclaimer, the term of this patent is extended or adjusted under 35 U.S.C. 154(b) by 846 days.

(21) Appl. No.: 12/337,966

(22) Filed: Dec. 18, 2008

(65) Prior Publication Data

US 2009/0180753 A1   Jul. 16, 2009

Related U.S. Application Data

(62) Division of application No. 11/209,577, filed on Aug. 23, 2005.

(30) Foreign Application Priority Data

Sep. 28, 2004   (JP) ................................. 2004-282215

(51) Int. Cl.
  *H04N 5/92*   (2006.01)
  *H04N 5/93*   (2006.01)

(52) U.S. Cl. ...................................... 386/326; 386/353

(58) Field of Classification Search .................. None
See application file for complete search history.

(56) References Cited

U.S. PATENT DOCUMENTS

| 4,224,644 A | 9/1980 | Lewis et al. | |
|---|---|---|---|
| 7,272,843 B1 * | 9/2007 | Nejime et al. | 725/32 |
| 2001/0031132 A1 * | 10/2001 | Shirakawa et al. | 386/52 |

FOREIGN PATENT DOCUMENTS

| JP | 08-140043 | 5/1996 |
|---|---|---|
| JP | 2002-176401 | 6/2002 |
| JP | 2002-185885 | 6/2002 |
| JP | 2003-061023 | 2/2003 |
| JP | 2003-087736 | 3/2003 |
| JP | 2003-259336 | 9/2003 |
| JP | 2003-348504 | 12/2003 |

* cited by examiner

*Primary Examiner* — Thai Tran
*Assistant Examiner* — Asher Khan
(74) *Attorney, Agent, or Firm* — K&L Gates LLP

(57) ABSTRACT

A method, apparatus and program for recording and playing back content data, method, apparatus and program for playing back content data, and method, apparatus and program for recording content data. The recording and playback apparatus is configured to record content data including a content and play back the content of the content data at a position specified by first relative time information indicating a relative time with respect to a start position of the content. A record start time information generator generates record start time information. A stream playback control table generator generates a stream playback control table associated with a stream resource record in a content data recording unit. Based on the content start time information and the record start time information, a relative time information correction unit corrects relative time information, of a segment to be played back, identified by a metadata manager based on segment metadata. A read controller controls a reading process according to the relative position information corresponding to the corrected relative time information identified by the metadata manager.

4 Claims, 24 Drawing Sheets

FIG. 4

| TITLE | PROGRAM CONTENT INFORMATION 121A | | | | RECORD START POSITION INFORMATION 121B |
|---|---|---|---|---|---|
| | PERFORMER | SUMMARY | GENRE | | |
| A | AA | AAA | AAAA | | AAAAA |
| B | BB | BBB | BBBB | | BBBBB |
| C | CC | CCC | CCCC | | CCCCC |
| D | DD | DDD | DDDD | | DDDDD |
| E | EE | EEE | EEEE | | EEEEE |
| F | FF | FFF | FFFF | | FFFFF |
| G | GG | GGG | GGGG | | GGGGG |
| H | HH | HHH | HHHH | | HHHHH |

| ID | ATTRIBUTE INFORMATION | RELATIVE TIME INFORMATION |
|---|---|---|
| ID1 | ABC | TS1 |
| ID2 | BCD | TS2 |
| ID3 | CDE | TS3 |
| ID4 | DEF | TS4 |
| ID5 | EFG | TS5 |
| ID6 | FGH | TS6 |
| ID7 | GHI | TS7 |
| ID8 | HIJ | TS8 |

| RELATIVE TIME INFORMATION | RELATIVE POSITION INFORMATION |
|---|---|
| Tgop1 | Dgop1 |
| Tgop2 | Dgop2 |
| Tgop3 | Dgop3 |
| Tgop4 | Dgop4 |
| Tgop5 | Dgop5 |
| Tgop6 | Dgop6 |
| Tgop7 | Dgop7 |
| Tgop8 | Dgop8 |

METHOD, APPARATUS AND PROGRAM FOR RECORDING AND PLAYING BACK CONTENT DATA, METHOD, APPARATUS AND PROGRAM FOR PLAYING BACK CONTENT DATA, AND METHOD, APPARATUS AND PROGRAM FOR RECORDING CONTENT DATA

CROSS REFERENCES TO RELATED APPLICATIONS

The present application is a divisional of U.S. patent application Ser. No. 11/209,577, filed on Aug. 23, 2005 and claims priority to Japanese Patent Application No. 2004-282215 filed in the Japan Patent Office on Sep. 28, 2004, the entire contents of which being incorporated herein by reference.

BACKGROUND

The present invention relates to a method, apparatus and program for recording and playing back content data, a method, apparatus and program for playing back content data, and a method, apparatus and program for recording content data. More particularly, the present invention relates to a method, apparatus and program for recording and playing back content data, a method, apparatus and program for playing back content data, and a method, apparatus and program for recording content data that make it possible for a user to view a specified content in a highly reliable fashion.

In recent years, a digital broadcast service provided by a broadcast station by transmitting a digital television signal has become popular. In digital broadcast services, because a broadcast television signal is in the form of digital data, it is easy to process the television signal. Therefore, if a broadcast station supplies metadata together with a content, a television receiver not only can simply output the received content but also can process the received content in various ways.

For example, many methods have been proposed to transmit, together with a program (content), information associated with the program to provide various kinds of services such as electronic program guide information, a program index, subtitles, sub audio information (for vision-impaired users), supplementary program information (indicating, for example, performers or the like, a summary of a program, etc.), a multiview television image (using a plurality of cameras located at different positions), and/or an interactive program (a shopping program, a questionnaire program, etc.) as disclosed, for example, in Japanese Unexamined Patent Application Publication No. 2002-176401.

A method has been proposed to control information associated with image objects multiplexed on a data channel so as to display image objects in a superimposed manner in synchronization with video/audio data multiplexed on a video/audio channel of a digital broadcast program so that if an image object is selected, the program is controlled in accordance with information associated with the selected image object as disclosed, for example, in Japanese Unexamined Patent Application Publication No. 2002-185885.

A method has also been proposed to provide sub-information associated with a particular image object in a television program image such that a viewer can easily acquire sub-information via link data as disclosed, for example, in Japanese Unexamined Patent Application Publication No. 2003-259336.

Furthermore, not only associated data is simply added to a main broadcast program data (content data) as in the above-described techniques, but a method has been proposed to control a program receiving mode or a program display mode by additional sub-data.

For example, it has been proposed to record, in a television receiver, a program (program) broadcast from a broadcast station and play back specified one or more units or scenes (segments) of the recorded program in accordance with a request issued by a user. This type of broadcast service is known as server-type broadcasting. In this technique, for example, a broadcast station provides, in addition to program data, segment metadata indicating an attribute of segments and the relative time of each segment with respect to the start of the program to a television receiver. The television receiver acquires the segment metadata as well as the program data (content data) and plays back a particular segment based on the segment metadata.

FIG. 1 shows an example of an example of a known method of extracting a segment. As shown in a lower area of FIG. 1, a television receiver receives segment metadata 11 as well as a stream resource 1 in the MPEG2-TS (Moving Picture Experts Group 2-Transport Stream) format as program data. When the television receiver records the stream resource 1, the television receiver produces a stream playback control table 12 indicating the correspondence between relative time information indicating a temporal position as measured from a start of the stream resource 1 and relative position information indicating a data position as measured from the start of the stream resource 1, for picture (frame) data of the stream resource 1, as represented by dashed line 21. In this process of generating the stream playback control table 12, the television receiver generates elements of the stream playback control table 12 in units of GOPs (Group Of Pictures) (such that relative time/position information indicates the time/position of the first picture of each GOP).

If a user specifies attribute information corresponding to an ID of "n" (attribute information associated with a segment N) in the segment metadata 11 (as shown by an arrow 22), the television receiver identifies relative time information Tsegn corresponding to the specified attribute information. The television receiver further identifies relative position information Dsegn corresponding to the identified relative time information Tsegn, based on the stream playback control table 12 (as shown by an arrow 23). Based on the identified relative position information Dsegn, the television receiver accesses the stream resource 1 to read the specified segment N.

The television receiver does not necessarily always operate in synchronization with broadcast processing performed by a broadcast station. In digital broadcasting, the television receiver generally controls the processing timing in accordance with a time offset table (TOT) that is a clock signal supplied from a broadcast station. For example, when automatic recording of a program is programmed, the television receiver detects the current time based on the TOT and starts the recording operation when the current time reaches the programmed record start time.

However, the accuracy of the TOT is not high enough to precisely control the broadcast timing in units of frames. For example, depending on the radio wave propagation condition, as great a shift in the broadcast timing as a few seconds from an intended start time can occur. In the conventional television receiver, because the recording timing is controlled based on the time information with such low accuracy, it is difficult to start recording exactly synchronously with the start of a broadcast program. Furthermore, in the television receiver, there is a possibility that a delay occurs in receiving or recording of a program due to an event of an interrupt.

For the above-described reasons, it is sometimes difficult for the television receiver to start recording of a program (a broadcast content) specified to be recorded precisely from the start of the program and it is also difficult to end the recording precisely at the end of the program. For example, when a program is set to be automatically recorded in accordance with an electronic program guide (EPG), the television receiver starts recording of the program at the predetermined start time. However, there is a possibility that the recording of the program starts before or after the actual start of the program, a shift can occur between the start of the recorded data and the start of the program. Furthermore, for the same reasons, there is a possibility that the recording of the program is ended before or after the actual end of the program.

Thus, if playback of data is controlled by the above-described method, there is a possibility that a shift occurs between the relative time information (relative time information indicating the start position of a program) described in the segment metadata 11 supplied from a broadcast station and the relative time information (relative time information with respect to the start position of the recorded stream resource 1) described in the generated stream playback control table 12. If the data is read in accordance with the relative position information obtained in the above-described situation, there is a possibility that the playback of the segment N is started before or after the correct start position or the playback is ended before or after the correct end position. That is, there is a possibility that the specified segment N is not correctly played back.

SUMMARY

In view of the above, the present invention provides a technique of playing back a content more precisely such that the playback starts from the exact start position and ends at the exact end position thereby ensuring that a user can view the specified content.

More specifically, a recording and playback apparatus according to an embodiment of the present invention includes first recording means for recording the content data, record start time information generation means for generating, using reference time information, record start time information indicating time information associated with a record start position of the content data recorded by the first recording means, playback control table generation means for generating a playback control table indicating, for a particular part of the content data recorded by the first recording means, correspondence between second relative time information indicating a relative time with respect to the record start position of the content data and the amount of the content data as measured from the record start position, second recording means for recording playback control information including content start time information indicating the content start position using the reference time information, the record start time information generated by the record start time information generation means, and the playback control table generated by the playback control table generation means, playback control information reading means for reading the content start time information, the record start time information, and the playback control table recorded by the second recording means, relative time information correction means for correcting the first relative time information specifying a playback position of the content data, based on the content start time information and the record start time information read by the playback control information reading means, so as to acquire the second relative time information, identification means for identifying the relative position information of the playback position, based on the second relative time information acquired via the correction made by the relative time information correction means using the playback control table read by the playback control information reading means, and playback means for playing back the contend data by reading the content data at the playback position corresponding to the relative position information identified by the identification means.

The recording and playback apparatus may further include receiving means for receiving the content data and the content start time information broadcast by a broadcast station.

The recording and playback apparatus may further include communication means for communicating with another apparatus to acquire the content data and the content start time information transmitted from that apparatus.

The recording and playback apparatus may further include output means for outputting the content data played back by the playback means.

The content data may be in a form compressed according to the MPEG standard, the playback control table generation means may generate the playback control table indicating the correspondence between the second relative time information and the relative position information for a first picture of each GOP of the content data, and, based on the playback control table, the identification means may redefine the playback position at the first picture of a GOP including the playback position and may identify the relative position information of the first picture.

The content data may be in a form encrypted according to a predetermined method, and the recording and playback apparatus may further include decoding means for decoding the encrypted content data, and playback position setting means for setting the playback position such that the playback position provides a period of time equal to or longer than a period of time necessary for the decoding means to complete the process of decoding the encrypted content data.

A recording and playback method according to an embodiment of the invention includes the steps of recording the content data, generating, using reference time information, record start time information indicating time information associated with a record start position of the content data recorded in the content data recording step, generating a playback control table indicating, for a particular part of the content data recorded in the content data recording step, correspondence between second relative time information indicating a relative time with respect to the record start position of the content data and the amount of the content data as measured from the record start position, recording playback control information including content start time information indicating the content start position using the reference time information, the record start time information generated in the record start time information generation step, and the playback control table generated in the playback control table generation step, reading the content start time information, the record start time information, and the playback control table recorded in the playback control information recording step, correcting the first relative time information specifying a playback position of the content data, based on the content start time information and the record start time information read in the playback control information reading step, so as to acquire the second relative time information, identifying the relative position information of the playback position, based on the second relative time information acquired in the relative time information correction step using the playback control table read in the playback control information reading step, and playing back the contend data by reading the content data at the playback position corresponding to the relative position information identified in the identification step.

A program according an embodiment of the present invention includes the steps of recording the content data, generating, using reference time information, record start time information indicating time information associated with a record start position of the content data recorded in the content data recording step, generating a playback control table indicating, for a particular part of the content data recorded in the content data recording step, correspondence between second relative time information indicating a relative time with respect to the record start position of the content data and the amount of the content data as measured from the record start position, recording playback control information including content start time information indicating the content start position using the reference time information, the record start time information generated in the record start time information generation step, and the playback control table generated in the playback control table generation step, reading the content start time information, the record start time information, and the playback control table recorded in the playback control information recording step, correcting the first relative time information specifying a playback position of the content data, based on the content start time information and the record start time information read in the playback control information reading step, so as to acquire the second relative time information, identifying the relative position information of the playback position, based on the second relative time information acquired in the relative time information correction step using the playback control table read in the playback control information reading step, and playing back the contend data by reading the content data at the playback position corresponding to the relative position information identified in the identification step.

A playback apparatus according to an embodiment of the present invention includes playback control information reading means for reading, from a recording medium, content start time information indicating, using reference time information, time information associated with a start position of a content, record start time information indicating, using the reference time information, time information associated with a record start position of the content data, and a playback control table indicating, for a particular part of the content data recorded on the recording medium, correspondence between second relative time information indicating a relative time with respect to the record start position of the content data and the amount of the content data as measured from the record start position, relative time information correction means for correcting the first relative time information specifying a playback position of the content data, based on the content start time information and the record start time information read by the playback control information reading means, so as to acquire the second relative time information, identification means for identifying the relative position information of the playback position, based on the second relative time information acquired via the correction made by the relative time information correction means using the playback control table read by the playback control information reading means, and playback means for playing back the contend data by reading the content data at the playback position corresponding to the relative position information identified by the identification means.

The playback apparatus may further include output means for outputting the content data played back by the playback means.

In the playback apparatus, the content data may be in a form compressed according to the MPEG standard, and, based on the playback control table indicating the correspondence between the second relative time information and the relative position information for the first picture of each GOP of the content data, the identification means may redefine the playback position at the first picture of a GOP including the playback position and may identify the relative position information of the first picture.

In the playback apparatus, the content data may be in a form encrypted according to a predetermined method, and the playback apparatus may further include decoding means for decoding the encrypted content data, and playback position setting means for setting the playback position such that the playback position provides a period of time equal to or longer than a period of time necessary for the decoding means to complete the process of decoding the encrypted content data.

A playback method according to an embodiment of the present invention includes the steps of reading, from a recording medium, content start time information indicating, using reference time information, time information associated with a start position of a content, record start time information indicating, using the reference time information, time information associated with a record start position of the content data, and a playback control table indicating, for a particular part of the content data recorded on the recording medium, correspondence between second relative time information indicating a relative time with respect to the record start position of the content data and the amount of the content data as measured from the record start position, correcting the first relative time information specifying a playback position of the content data, based on the content start time information and the record start time information read in the playback control information reading step, so as to acquire the second relative time information, identifying the relative position information of the playback position, based on the second relative time information acquired in the relative time information correction step using the playback control table read in the playback control information reading step, and playing back the contend data by reading the content data at the playback position corresponding to the relative position information identified in the identification step.

A program according to an embodiment of the present invention includes the steps of reading, from a recording medium, content start time information indicating, using reference time information, time information associated with a start position of a content, record start time information indicating, using the reference time information, time information associated with a record start position of the content data, and a playback control table indicating, for a particular part of the content data recorded on the recording medium, correspondence between second relative time information indicating a relative time with respect to the record start position of the content data and the amount of the content data as measured from the record start position, correcting the first relative time information specifying a playback position of the content data, based on the content start time information and the record start time information read in the playback control information reading step, so as to acquire the second relative time information, identifying the relative position information of the playback position, based on the second relative time information acquired in the relative time information correction step using the playback control table read in the playback control information reading step, and playing back the contend data by reading the content data at the playback position corresponding to the relative position information identified in the identification step.

A recording apparatus according to an embodiment of the present invention includes first recording means for recording the content data, record start time information generation means for generating, using reference time information, record start time information indicating time information associated with a record start position of the content data recorded by the first recording means, playback control table generation means for generating a playback control table indicating, for a particular part of the content data recorded by the first recording means, correspondence between second relative time information indicating a relative time with respect to the record start position of the content data and the amount of the content data as measured from the record start position, second recording means for recording playback control information including content start time information indicating the content start position using the reference time information, the record start time information generated by the record start time information generation means, and the playback control table generated by the playback control table generation means.

The recording apparatus may further include receiving means for receiving the content data and the content start time information broadcast by a broadcast station.

The recording apparatus may further include communication means for communicating with another apparatus to acquire the content data and the content start time information transmitted from that apparatus.

A recording method according to an embodiment of the present invention includes the steps of recording the content data, generating, using reference time information, record start time information indicating time information associated with a record start position of the content data recorded in the content data recording step, generating a playback control table indicating, for a particular part of the content data recorded in the content data recording step, correspondence between second relative time information indicating a relative time with respect to the record start position of the content data and the amount of the content data as measured from the record start position, and recording playback control information including content start time information indicating the content start position using the reference time information, the record start time information generated in the record start time information generation step, and the playback control table generated in the playback control table generation step.

A program according to an embodiment of the present invention includes the steps of recording the content data, generating, using reference time information, record start time information indicating time information associated with a record start position of the content data recorded in the content data recording step, generating a playback control table indicating, for a particular part of the content data recorded in the content data recording step, correspondence between second relative time information indicating a relative time with respect to the record start position of the content data and the amount of the content data as measured from the record start position, recording playback control information including content start time information indicating the content start position using the reference time information, the record start time information generated in the record start time information generation step, and the playback control table generated in the playback control table generation step.

A recording and playback apparatus according to an embodiment of the present invention includes first recording means for recording the content data, record start time information generation means for generating, using reference time information, record start time information indicating time information associated with a record start position of the content data recorded by the first recording means, second recording means for recording playback control information including content start time information indicating the content start position using the reference time information, the record start time information generated by the record start time information generation means, and a playback control table indicating, for a particular part of the content data recorded by the first recording means, correspondence between the relative time information and first relative position information indicating the amount of data as measured from the start of the content, playback control information reading means for reading the content start time information, the record start time information, and the playback control table recorded by the second recording means, offset value calculation means for calculating an offset value to be used in correction of the first relative position information, using the content start time information, the record start time information, and the playback control table read by the playback control information reading means, identification means for identifying the first relative position information associated with the playback position specified by the relative time information, based on the playback control table read by the playback control information reading means, relative position information correction means for correcting the first relative position information identified by the identification means, based on the offset value calculated by the offset value calculation means, to acquire the second relative position information indicating the amount of data as measured from the record start position of the content data recorded by the first recording means, and playback means for playing back the content data by reading the content data at the playback position, based on the second relative position information acquired via the correction process performed by the relative position information correction means.

A recording and playback method according to an embodiment of the present invention includes the steps of recording the content data, generating, using reference time information, record start time information indicating time information associated with a record start position of the content data recorded in the content data recording step, recording playback control information including content start time information indicating the content start position using the reference time information, the record start time information generated in the record start time information generation step, and a playback control table indicating, for a particular part of the content data recorded in the content data recording step, correspondence between the relative time information and first relative position information indicating the amount of data as measured from the start of the content, reading the content start time information, the record start time information, and the playback control table recorded in the playback control information recording step, calculating an offset value to be used in correction of the first relative position information, using the content start time information, the record start time information, and the playback control table read in the playback control information reading step, identifying the first relative position information associated with the playback position specified by the relative time information, based on the playback control table read in the playback control information reading step, correcting the first relative position information identified in the identification step, based on the offset value calculated in the offset value calculation step, to acquire the second relative position information indicating the amount of data as measured from the record start position of the content data recorded in the content data recording step, and playing back the content data by reading the content data at the playback position, based on the second relative position information acquired in the relative position information correction step.

A program according to an embodiment of the present invention includes the steps of recording the content data, generating, using reference time information, record start time information indicating time information associated with a record start position of the content data recorded in the content data recording step, recording playback control information including content start time information indicating the content start position using the reference time information, the record start time information generated in the record start time information generation step, and a playback control table indicating, for a particular part of the content data recorded in the content data recording step, correspondence between the relative time information and first relative position information indicating the amount of data as measured from the start of the content, reading the content start time information, the record start time information, and the playback control table recorded in the playback control information recording step, calculating an offset value to be used in correction of the first relative position information, using the content start time information, the record start time information, and the playback control table read in the playback control information reading step, identifying the first relative position information associated with the playback position specified by the relative time information, based on the playback control table read in the playback control information reading step, correcting the first relative position information identified in the identification step, based on the offset value calculated in the offset value calculation step, to acquire the second relative position information indicating the amount of data as measured from the record start position of the content data recorded in the content data recording step, and playing back the content data by reading the content data at the playback position, based on the second relative position information acquired in the relative position information correction step.

In the recording and playback apparatus, the recording and playback method, and the program according to an embodiment of the present invention, content data is recorded, record start time information indicating, using the reference time information, time information associated with a record start position of the content data is generated, a playback control table is generated to represent, for a particular part of the recorded content data, correspondence between second relative time information indicating a relative time with respect to the record start position of the content data and the amount of the content data as measured from the record start position, content start time information indicating the content start position using the reference time information, record start time information and the playback control table are recoded as playback control information, the content start time information, the record start time information, and the playback control table recorded in the playback control information are read, the first relative time information specifying the playback position of the content data is corrected based on the content start time information and the record start time information so as to acquire the second relative time information, the relative position information of the playback position is identified based on the second relative time information using the playback control table, and reading the content data at the playback position corresponding to the identified relative position information thereby playing back the content data.

In the playback apparatus, the playback method, and the program according to an embodiment of the invention, content start time information indicating, using reference time information, time information associated with a start position of a content, record start time information indicating, using the reference time information, time information associated with a record start position of the content data, and a playback control table indicating, for a particular part of the content data recorded on the recording medium, correspondence between second relative time information indicating a relative time with respect to the record start position of the content data and the amount of the content data as measured from the record start position are read from a recording medium. The second relative time information is acquired by correcting the first relative time information specifying a playback position of the content data, based on the content start time information and the record start time information. Using the playback control table, the relative position information of the playback position is identified based on the corrected second relative time information. The contend data at the playback position corresponding to the identified relative position information is read and played back.

In the recording apparatus, the recording method, and the program according to an embodiment of the present invention, content data is recorded, record start time information indicating time information associated with a record start position of the content data is generated using reference time information, and a playback control table is generated to represent, for a particular part of the recorded content data, correspondence between second relative time information indicating a relative time with respect to the record start position of the content data and the amount of the content data as measured from the record start position. Furthermore, control information including content start time information indicating the content start position using the reference time information, the record start time information, and the playback control table are recorded as playback control information.

In the recording and playback apparatus, the recording and playback method, and the program according to an embodiment of the present invention, content data is recorded, and record start time information indicating time information associated with a record start position of the content data is generated using reference time information. Furthermore, control information including content start time information indicating the content start position using the reference time information, the record start time information, and a playback control table indicating, for a particular part of the content data, correspondence between the relative time information and first relative position information indicating the amount of data as measured from the start of the content are recorded. The content start time information, the record start time information, and the playback control table are read, and an offset value to be used in correction of the first relative position information is calculated using the content start time information, the record start time information, and the playback control table. The first relative position information associated with the playback position specified by the relative time information is then identified based on the playback control table, and the identified first relative position information is corrected using the offset value to acquire the second relative position information indicating the amount of data as measured from the record start position of the content data. Finally, the content data is played back by reading the content data at the playback position, based on the corrected second relative position information.

Thus, the present invention provides the great advantage that a content specified by a user is precisely played back such that the user can view the exact specified content.

Additional features and advantages are described herein, and will be apparent from, the following Detailed Description and the figures.

BRIEF DESCRIPTION OF THE FIGURES

FIG. 4 shows an example of a format of content metadata shown in FIG. 3.

FIG. 5 shows an example of a format of segment metadata shown in FIG. 3.

FIG. 6 shows an example of a format of a stream playback control table shown in FIG. 3.

DETAILED DESCRIPTION

The present invention relates to a method, apparatus and program for recording and playing back content data, a method, apparatus and program for playing back content data, and a method, apparatus and program for recording content data. More particularly, the present invention relates to a method, apparatus and program for recording and playing back content data, a method, apparatus and program for playing back content data, and a method, apparatus and program for recording content data that make it possible for a user to view a specified content in a highly reliable fashion.

Figure 1:
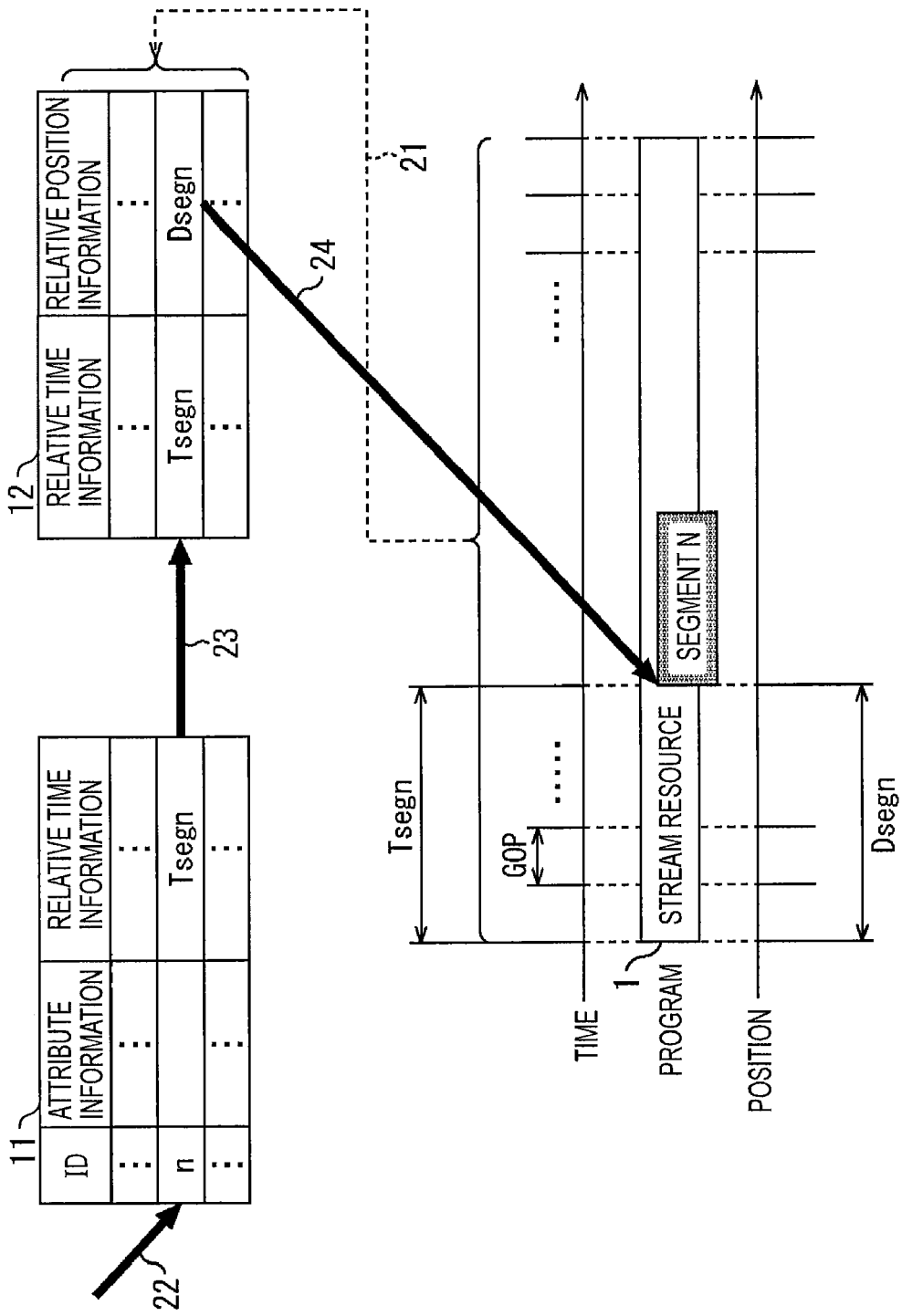
FIG. 1 is diagram showing an example of a known method of extracting a segment.
Figure 2:
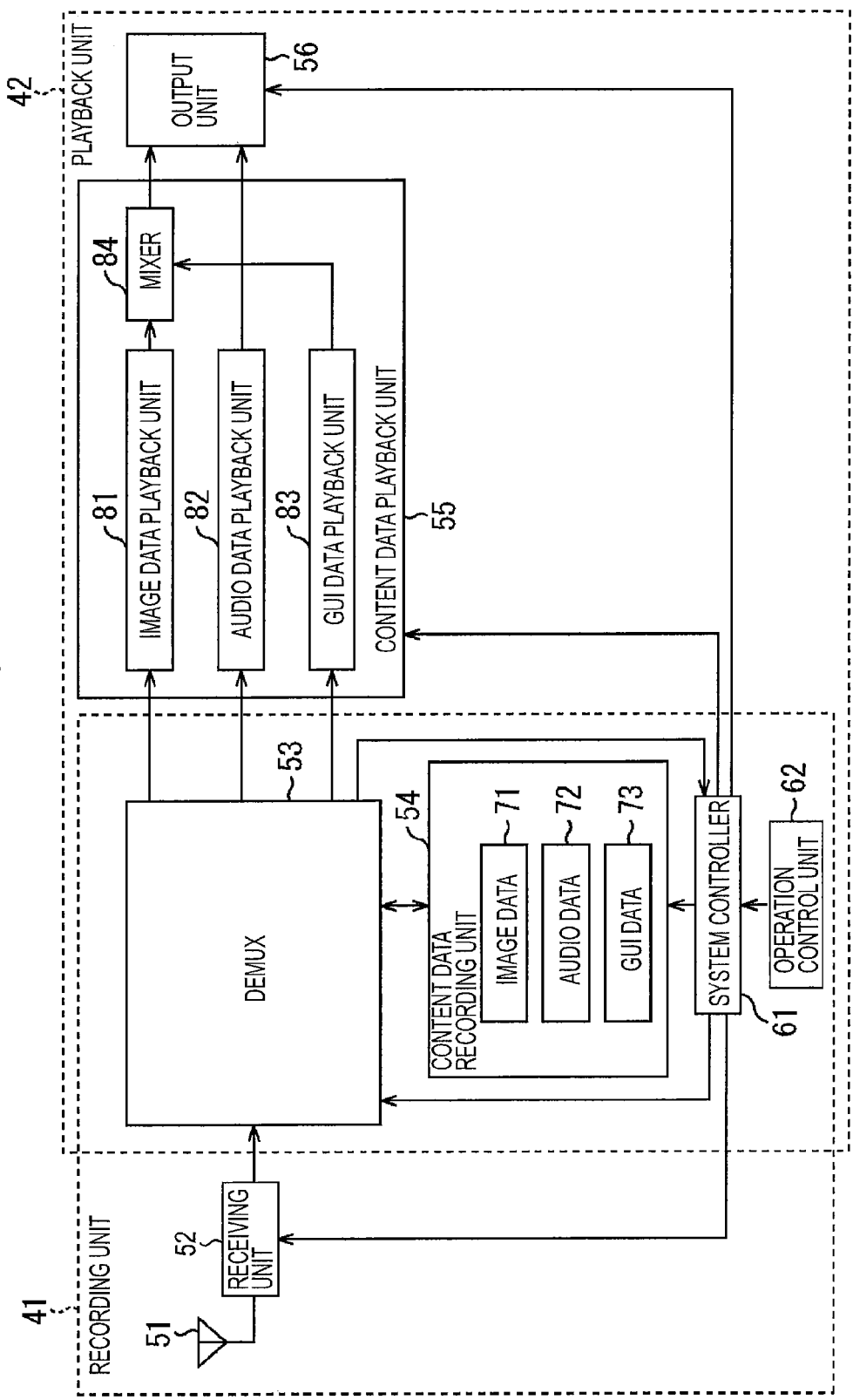
FIG. 2 is a block diagram showing a digital broadcast television receiver according to an embodiment of the present invention.
Figure 3:
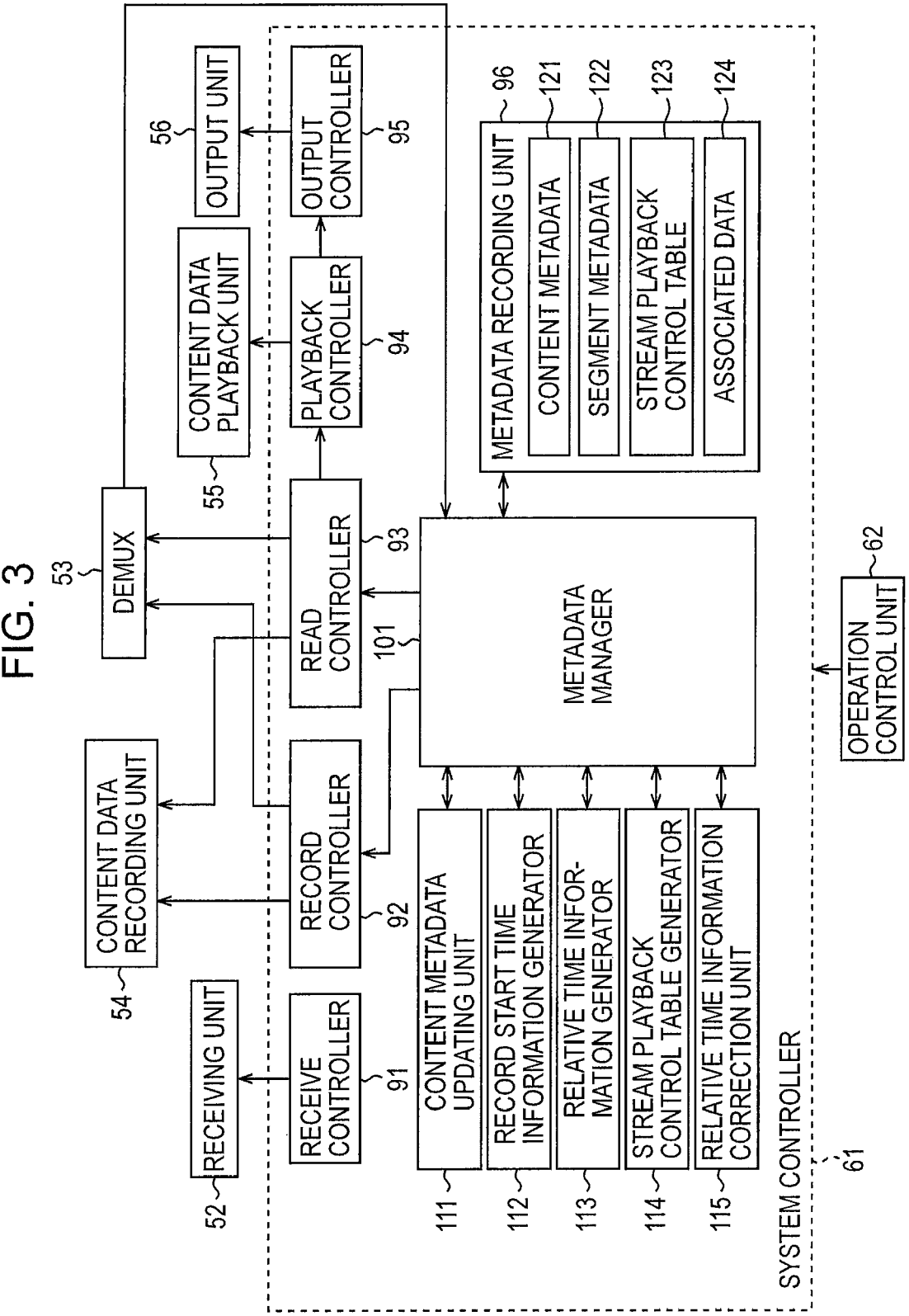
FIG. 3 is a block diagram showing an example of a detailed implementation of a system controller shown in FIG. 2.

A recording and playback apparatus (for example, a digital broadcast television receiver shown in FIG. 2) according to an embodiment of the present invention includes first recording means (for example, a content data recording unit shown in FIG. 2) that records the content data; record start time information generation means (for example, a record start time information generator shown in FIG. 3) for generating, using reference time information, record start time information (for example, record start time information shown in FIG. 7) indicating time information associated with a record start position of the content data recorded by the first recording means, playback control table generation means (for example, a stream playback control table generator shown in FIG. 3) for generating a playback control table (for example, a stream playback control table shown in FIG. 3) indicating, for a particular part of the content data recorded by the first recording means, correspondence between second relative time information indicating a relative time with respect to the record start position of the content data and the amount of the content data as measured from the record start position, second recording means (for example, metadata recording unit shown in FIG. 3) for recording playback control information (for example, content start time information shown in FIG. 7) including content start time information indicating the content start position using the reference time information, the record start time information generated by the record start time information generation means, and the playback control table generated by the playback control table generation means, playback control information reading means (for example, metadata manager shown in FIG. 3) for reading the content start time information, the record start time information, and the playback control table recorded by the second recording means, relative time information correction means (for example, relative time information correction unit shown in FIG. 3) for correcting the first relative time information specifying a playback position of the content data, based on the content start time information and the record start time information read by the playback control information reading means, so as to acquire the second relative time information, identification means (for example, a metadata manager shown in FIG. 3) for identifying the relative position information of the playback position, based on the second relative time information acquired via the correction made by the relative time information correction means using the playback control table read by the playback control information reading means, and playback means (for example, content data playback unit shown in FIG. 2) for playing back the contend data by reading the content data at the playback position corresponding to the relative position information identified by the identification means.

The recording and playback apparatus may further include receiving means (for example, a receiving unit shown in FIG. 2) for receiving the content data and the content start time information broadcast by a broadcast station.

The recording and playback apparatus may further include communication means (for example, a communication unit shown in FIG. 23) for communicating with another apparatus to acquire the content data and the content start time information transmitted from that apparatus.

The recording and playback apparatus may further include output means (for example, an output unit shown in FIG. 2) for outputting the content data played back by the playback means.

Figure 10:
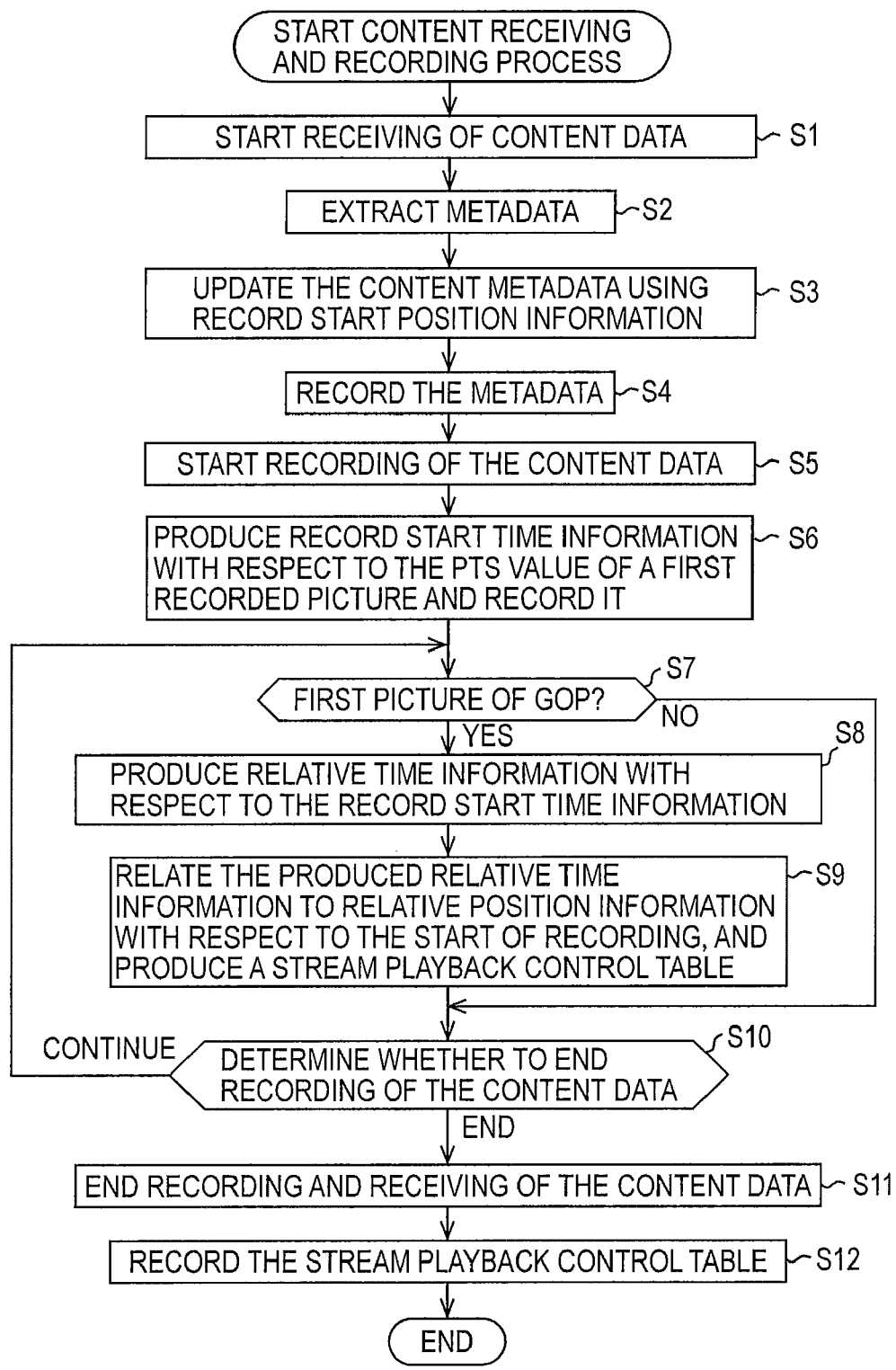
FIG. 10 is a flow chart showing a process of receiving and recording a content.
Figure 11:
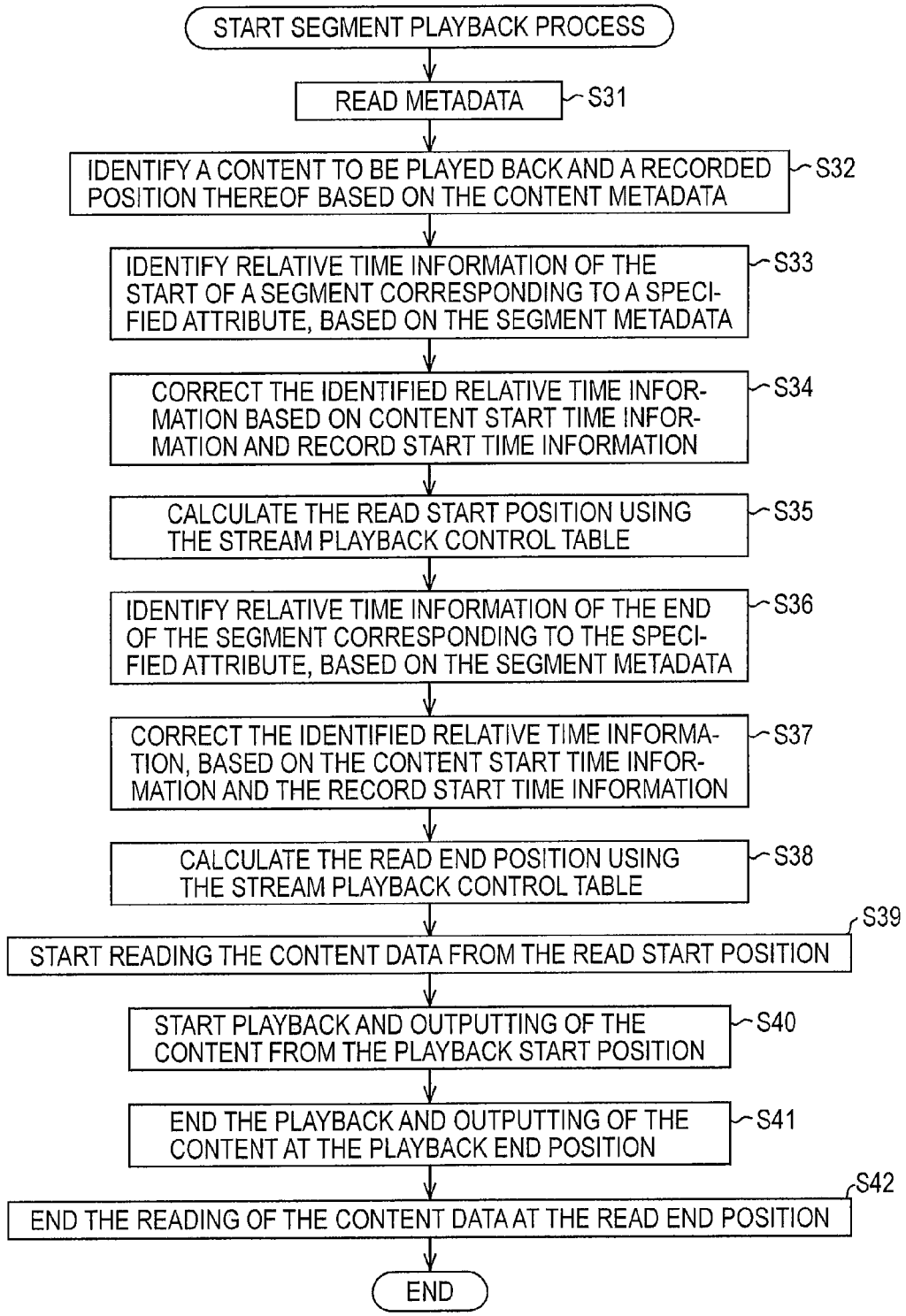
FIG. 11 is a flow chart showing a segment playback process.

The content data may be in a form compressed according to the MPEG standard, the playback control table generation means may generate the playback control table indicating the correspondence between the second relative time information and the relative position information for a first picture of each GOP of the content data (for example, in steps S7 to S9 shown in FIG. 10), and, based on the playback control table, the identification means may redefine the playback position at the first picture of a GOP including the playback position and may identify the relative position information of the first picture (for example, in step S33 or S36 in FIG. 11).

The content data may be in a form encrypted according to a predetermined method, and the recording and playback apparatus may further comprise decoding means (for example, a decoder shown in FIG. 12) for decoding the encrypted content data, and playback position setting means (for example, read start/end position setting unit shown in FIG. 13) for setting the playback position such that the playback position provides a period of time equal to or longer than a period of time necessary for the decoding means to complete the process of decoding the encrypted content data.

A recording and playback method according to an embodiment of the present invention includes the steps of recording the content data (for example, in step S5 shown in FIG. 10), generating (for example, in step S6 shown in FIG. 10), using reference time information, record start time information indicating time information associated with a record start position of the content data recorded in the content data recording step, generating (for example, in step S9 shown in FIG. 10) a playback control table indicating, for a particular part of the content data recorded in the content data recording step, correspondence between second relative time information indicating a relative time with respect to the record start position of the content data and the amount of the content data as measured from the record start position, recording (for example, in steps S4, S6, and S12 shown in FIG. 11) playback control information including content start time information indicating the content start position using the reference time information, the record start time information generated in the record start time information generation step, and the playback control table generated in the playback control table generation step, reading (for example, in step S31 shown in FIG. 11) the content start time information, the record start time information, and the playback control table recorded in the playback control information recording step, correcting (for example, in step S34 or S37 shown in FIG. 11) the first relative time information specifying a playback position of the content data, based on the content start time information and the record start time information read in the playback control information reading step, so as to acquire the second relative time information, identifying (for example, in step S35 or S38 shown in FIG. 11) the relative position information of the playback position, based on the second relative time information acquired in the relative time information correction step using the playback control table read in the playback control information reading step, and playing back (for example, in step S39 shown in FIG. 11) the contend data by reading the content data at the playback position corresponding to the relative position information identified in the identification step.

A program according to an embodiment of the present invention includes the steps of recording the content data (for example, in step S5 shown in FIG. 10), generating (for example, in step S6 shown in FIG. 10), using reference time information, record start time information indicating time information associated with a record start position of the content data recorded in the content data recording step, generating (for example, in step S9 shown in FIG. 10) a playback control table indicating, for a particular part of the content data recorded in the content data recording step, correspondence between second relative time information indicating a relative time with respect to the record start position of the content data and the amount of the content data as measured from the record start position, recording (for example, in steps S4, S6, and S12 shown in FIG. 11) playback control information including content start time information indicating the content start position using the reference time information, the record start time information generated in the record start time information generation step, and the playback control table generated in the playback control table generation step, reading (for example, in step S31 shown in FIG. 11) the content start time information, the record start time information, and the playback control table recorded in the playback control information recording step, correcting (for example, in step S34 or S37 shown in FIG. 11) the first relative time information specifying a playback position of the content data, based on the content start time information and the record start time information read in the playback control information reading step, so as to acquire the second relative time information, identifying (for example, in step S35 or S38 shown in FIG. 11) the relative position information of the playback position, based on the second relative time information acquired in the relative time information correction step using the playback control table read in the playback control information reading step, and playing back (for example, in step S39 shown in FIG. 11) the contend data by reading the content data at the playback position corresponding to the relative position information identified in the identification step.

A playback apparatus (for example, a playback unit shown in FIG. 2) includes playback control information reading means (for example, metadata manager shown in FIG. 3) for reading, from a recording medium, content start time information indicating, using reference time information, time information associated with a start position of a content, record start time information indicating, using the reference time information, time information associated with a record start position of the content data, and a playback control table indicating, for a particular part of the content data recorded on the recording medium, correspondence between second relative time information indicating a relative time with respect to the record start position of the content data and the amount of the content data as measured from the record start position, relative time information correction means (for example, relative time information correction unit shown in FIG. 3) for correcting the first relative time information specifying a playback position of the content data, based on the content start time information and the record start time information read by the playback control information reading means, so as to acquire the second relative time information, identification means (for example, a metadata manager shown in FIG. 3) for identifying the relative position information of the playback position, based on the second relative time information acquired via the correction made by the relative time information correction means using the playback control table read by the playback control information reading means, and playback means (for example, content data playback unit shown in FIG. 2) for playing back the contend data by reading the content data at the playback position corresponding to the relative position information identified by the identification means.

The playback apparatus may further include output means (for example, an output unit shown in FIG. 2) for outputting the content data played back by the playback means.

In the playback apparatus, the content data may be in a form compressed according to the MPEG standard, and, based on the playback control table indicating the correspondence between the second relative time information and the relative position information for the first picture of each GOP of the content data, the identification means may redefine the playback position at the first picture of a GOP including the playback position and may identify the relative position information of the first picture (for example, in step S33 or S36 in FIG. 11).

In the playback apparatus, the content data may be in a form encrypted according to a predetermined method, and the playback apparatus may further comprise decoding means (for example, a decoder shown in FIG. 12) for decoding the encrypted content data, and playback position setting means (for example, read start/end position setting unit shown in FIG. 13) for setting the playback position such that the playback position provides a period of time equal to or longer than a period of time necessary for the decoding means to complete the process of decoding the encrypted content data.

A playback method according to an embodiment of the present invention includes the steps of reading (for example, in step S31 shown in FIG. 11), from a recording medium, content start time information indicating, using reference time information, time information associated with a start position of a content, record start time information indicating, using the reference time information, time information associated with a record start position of the content data, and a playback control table indicating, for a particular part of the content data recorded on the recording medium, correspondence between second relative time information indicating a relative time with respect to the record start position of the content data and the amount of the content data as measured from the record start position, correcting (for example, in step S34 or S37 shown in FIG. 11) the first relative time information specifying a playback position of the content data, based on the content start time information and the record start time information read in the playback control information reading step, so as to acquire the second relative time information, identifying (for example, in step S35 or S38 shown in FIG. 11) the relative position information of the playback position, based on the second relative time information acquired in the relative time information correction step using the playback control table read in the playback control information reading step, and playing back (for example, in step S39 shown in FIG. 11) the contend data by reading the content data at the playback position corresponding to the relative position information identified in the identification step.

A program according to an embodiment of the present invention includes the steps of reading (for example in step S31 shown in FIG. 11), from a recording medium, content start time information indicating, using reference time information, time information associated with a start position of a content, record start time information indicating, using the reference time information, time information associated with a record start position of the content data, and a playback control table indicating, for a particular part of the content data recorded on the recording medium, correspondence between second relative time information indicating a relative time with respect to the record start position of the content data and the amount of the content data as measured from the record start position, correcting (for example, in step S34 or S37 shown in FIG. 11) the first relative time information specifying a playback position of the content data, based on the content start time information and the record start time information read in the playback control information reading step, so as to acquire the second relative time information, identifying (for example, in step S35 or S38 shown in FIG. 11) the relative position information of the playback position, based on the second relative time information acquired in the relative time information correction step using the playback control table read in the playback control information reading step, and playing back (for example, in step S39 shown in FIG. 11) the contend data by reading the content data at the playback position corresponding to the relative position information identified in the identification step.

A recording apparatus according to an embodiment of the present invention includes first recording means (for example, a content data recording unit shown in FIG. 2) for recording the content data, record start time information generation means (for example, a record start time information generator shown in FIG. 3) for generating, using reference time information, record start time information indicating time information associated with a record start position of the content data recorded by the first recording means, playback control table generation means (for example, a stream playback control table generator shown in FIG. 3) for generating a playback control table indicating, for a particular part of the content data recorded by the first recording means, correspondence between second relative time information indicating a relative time with respect to the record start position of the content data and the amount of the content data as measured from the record start position, second recording means (for example, metadata recording unit shown in FIG. 3) for recording playback control information including content start time information indicating the content start position using the reference time information, the record start time information generated by the record start time information generation means, and the playback control table generated by the playback control table generation means.

The recording apparatus may further include receiving means (for example, a receiving unit shown in FIG. 2) for receiving the content data and the content start time information broadcast by a broadcast station.

The recording apparatus may further include communication means (for example, a communication unit shown in FIG. 23) for communicating with another apparatus to acquire the content data and the content start time information transmitted from that apparatus.

A recording method according to an embodiment of the present invention includes the steps of recording the content data (for example, in step S5 shown in FIG. 10), generating (for example, in step S6 shown in FIG. 10), using reference time information, record start time information indicating time information associated with a record start position of the content data recorded in the content data recording step, generating (for example, in step S9 shown in FIG. 10) a playback control table indicating, for a particular part of the content data recorded in the content data recording step, correspondence between second relative time information indicating a relative time with respect to the record start position of the content data and the amount of the content data as measured from the record start position, recording (for example, in steps S4, S6, and S12 shown in FIG. 11) playback control information including content start time information indicating the content start position using the reference time information, the record start time information generated in the record start time information generation step, and the playback control table generated in the playback control table generation step.

A program according to an embodiment of the present invention includes the steps of recording the content data (for example, in step S5 shown in FIG. 10), generating (for example, in step S6 shown in FIG. 10), using reference time information, record start time information indicating time information associated with a record start position of the content data recorded in the content data recording step, generating (for example, in step S9 shown in FIG. 10) a playback control table indicating, for a particular part of the content data recorded in the content data recording step, correspondence between second relative time information indicating a relative time with respect to the record start position of the content data and the amount of the content data as measured from the record start position, recording (for example, in steps S4, S6, and S12 shown in FIG. 11) playback control information including content start time information indicating the content start position using the reference time information, the record start time information generated in the record start time information generation step, and the playback control table generated in the playback control table generation step.

Figure 18:
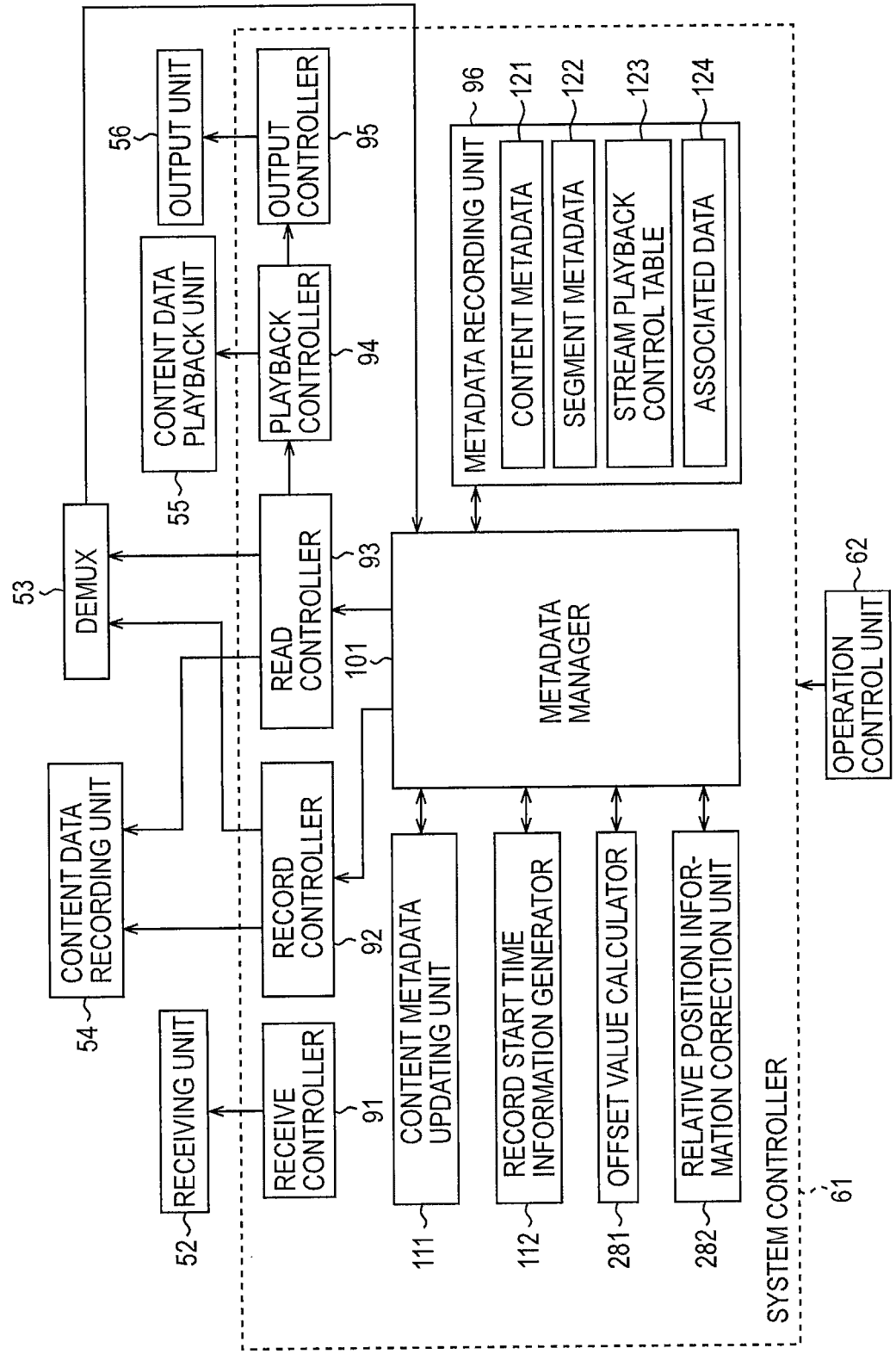
FIG. 18 is a block diagram showing another example of an implementation of a system controller shown in FIG. 2.

A recording and playback apparatus (for example, a digital broadcast television receiver shown in FIG. 2) includes first recording means (for example, a content data recording unit shown in FIG. 2) for recording the content data, record start time information generation means (for example, a record start time information generator shown in FIG. 3) for generating, using reference time information, record start time information indicating time information associated with a record start position of the content data recorded by the first recording means, second recording means (for example, metadata recording unit shown in FIG. 3) for recording playback control information including content start time information indicating the content start position using the reference time information, the record start time information generated by the record start time information generation means, and a playback control table indicating, for a particular part of the content data recorded by the first recording means, correspondence between the relative time information and first relative position information indicating the amount of data as measured from the start of the content, playback control information reading means (for example, metadata manager shown in FIG. 3) for reading the content start time information, the record start time information, and the playback control table recorded by the second recording means, offset value calculation means (for example, an offset value calculator shown in FIG. 18) for calculating an offset value to be used in correction of the first relative position information, using the content start time information, the record start time information, and the playback control table read by the playback control information reading means, identification means (for example, a metadata manager shown in FIG. 3) for identifying the first relative position information associated with the playback position specified by the relative time information, based on the playback control table read by the playback control information reading means, relative position information correction means (for example, a relative position information correction unit shown in FIG. 18) for correcting the first relative position information identified by the identification means, based on the offset value calculated by the offset value calculation means, to acquire the second relative position information indicating the amount of data as measured from the record start position of the content data recorded by the first recording means, and playback means (for example, a content data playback unit shown in FIG. 2) for playing back the content data by reading the content data at the playback position, based on the second relative position information acquired via the correction process performed by the relative position information correction means.

A recording and playback method according to an embodiment of the present invention includes the steps of recording the content data (for example, in step S115 shown in FIG. 21), generating (for example, in step S116 shown in FIG. 21), using reference time information, record start time information indicating time information associated with a record start position of the content data recorded in the content data recording step, recording (for example, in steps S114 and S116 shown in FIG. 21) playback control information including content start time information indicating the content start position using the reference time information, the record start time information generated in the record start time information generation step, and a playback control table indicating, for a particular part of the content data recorded in the content data recording step, correspondence between the relative time information and first relative position information indicating the amount of data as measured from the start of the content, reading (for example, in step S131 shown in FIG. 22) the content start time information, the record start time information, and the playback control table recorded in the playback control information recording step, calculating (for example, in step S134 shown in FIG. 22) an offset value to be used in correction of the first relative position information, using the content start time information, the record start time information, and the playback control table read in the playback control information reading step, identifying (for example, in step S136 or S139 shown in FIG. 22) the first relative position information associated with the playback position specified by the relative time information, based on the playback control table read in the playback control information reading step, correcting (for example, in step S137 or S140 shown in FIG. 22) the first relative position information identified in the identification step, based on the offset value calculated in the offset value calculation step, to acquire the second relative position information indicating the amount of data as measured from the record start position of the content data recorded in the content data recording step, and playing back (for example, in step S141 shown in FIG. 22) the content data by reading the content data at the playback position, based on the second relative position information acquired in the relative position information correction step.

A program according to an embodiment of the present invention includes the steps of recording the content data (for example, in step S115 shown in FIG. 21), generating (for example, in step S116 shown in FIG. 21), using reference time information, record start time information indicating time information associated with a record start position of the content data recorded in the content data recording step, recording (for example, in steps S114 and S116 shown in FIG. 21) playback control information including content start time information indicating the content start position using the reference time information, the record start time information generated in the record start time information generation step, and a playback control table indicating, for a particular part of the content data recorded in the content data recording step, correspondence between the relative time information and first relative position information indicating the amount of data as measured from the start of the content, reading (for example, in step S131 shown in FIG. 22) the content start time information, the record start time information, and the playback control table recorded in the playback control information recording step, calculating (for example, in step S134 shown in FIG. 22) an offset value to be used in correction of the first relative position information, using the content start time information, the record start time information, and the playback control table read in the playback control information reading step, identifying (for example, in step S136 or S139 shown in FIG. 22) the first relative position information associated with the playback position specified by the relative time information, based on the playback control table read in the playback control information reading step, correcting (for example, in step S137 or S140 shown in FIG. 22) the first relative position information identified in the identification step, based on the offset value calculated in the offset value calculation step, to acquire the second relative position information indicating the amount of data as measured from the record start position of the content data recorded in the content data recording step, and playing back (for example, in step S141 shown in FIG. 22) the content data by reading the content data at the playback position, based on the second relative position information acquired in the relative position information correction step.

The present invention is described in further detail below with reference to embodiments in conjunction with the accompanying drawings.

FIG. 2 shows a digital broadcast television receiver according to an embodiment of the present invention.

This digital broadcast television receiver 31 is adapted to receive a digital broadcast service provided by a broadcast station (not shown). That is, the digital broadcast television receiver 31 is configured to receive a digital television signal broadcast from the broadcast station and display a program according to the received television signal.

The digital broadcast television receiver 31 includes a recording unit 41 configured to receive broadcast digital television signal and records it as content data on a recording medium, and a playback unit 42 configured to read the content data recorded on the recording medium, plays it back, and outputs it.

More specifically, the digital broadcast television receiver 31 includes an antenna 51, a receiving unit 52, a demultiplexer 53, a content data recording unit 54, a content data playback unit 55, an output unit 56, a system controller 61, and an operation control unit 62.

The recording unit 41 includes the antenna 51, the receiving unit 52, the demultiplexer 53, the content data recording unit 54, the system controller 61, and the operation control unit 62. The playback unit 42 includes the demultiplexer 53, the content data recording unit 54, the content data playback unit 55, the output unit 56, the system controller 61, and the operation control unit 62.

The receiving unit 52 receives digital television signals broadcast from broadcast stations (not shown) via the antenna 51. The receiving unit 52 has a digital broadcast tuner (not shown) that controls a receiving frequency band such that a television signal broadcast from a particular broadcast station is selected from the plurality of television signals is extracted and furthermore broadcast data is extracted from the television signal. The resultant extracted broadcast data is supplied to a demultiplexer (DEMUX) 53.

The demultiplexer 53 extracts image data 71, audio data 72, and GUI (Graphical User Interface) data 73 from the supplied broadcast data and supplies the extracted data to a content data playback unit 55.

The image data 71 and the audio data 72 are in the form of compressed data in accordance with, for example, the MPEG2-TS (Moving Picture Experts Group 2-Transport Stream). The GUI data 73 includes, for example, text data, still image data, and/or script data, which are output as GUI images together with a content image and/or a voice/sound. The GUI data 73 may also be in the form of compressed data according to a particular method.

When the digital broadcast television receiver 31 records a program, the demultiplexer 53 supplies the image data 71, the audio data 72, and the GUI data 73 to the content data recording unit 54 to record them. The demultiplexer 53 also supplies various control metadata included in the broadcast data to the system controller 61.

The content data recording unit 54 includes, for example, a high-capacity storage medium such as a hard disk and a control mechanism for controlling the storage medium, and the content data recording unit 54 records the image data 71, the audio data 72, and the GUI data 73 supplied from the demultiplexer 53. These data may be separately recorded in different files or recorded in a multiplexed form in a single file.

The content data playback unit 55 reproduces image data and audio data to be output by performing a reproducing process including a decompression process and a correction process on the image data 71, the audio data 72, and the GUI data 73 supplied from the demultiplexer 53. The reproduced image data and audio data are supplied to the output unit 56. The content data playback unit 55 includes an image data playback unit 81, an audio data playback unit 82, a GUI data playback unit 83, and a mixer 84. The image data playback unit 81 performs a reproducing process on the image data supplied from the demultiplexer 53 and supplies the resultant reproduced image data to the mixer 84. The audio data playback unit 82 performs a reproducing process on the audio data supplied from the demultiplexer 53 and supplies the resultant reproduced audio data to the output unit 56. The GUI playback unit 81 performs a reproducing process on the GUI data supplied from the demultiplexer 53 and supplies the resultant reproduced GUI data to the mixer 84. The mixer 84 mixes the image data supplied from the image data playback unit 81 and the GUI data supplied from the GUI data playback unit 83, and mixer 84 supplies the resultant mixed image data to the output unit 56.

The output unit 56 includes, for example, a display such as a CRT or an LCD (not shown) for displaying an image and a speaker (not shown) for outputting a sound/voice. The output unit 56 may have an external output terminal via which to output the image data and the audio data to the outside of the digital broadcast television receiver 31.

The system controller 61 includes a CPU (Central Processing Unit), a ROM (Read Only Memory), and a RAM (Random Access Memory). In accordance with a command input via the operation control unit 62 by a user, the system controller 61 controls the entire digital broadcast television receiver 31 including the receiving unit 52, the demultiplexer 53, the content data recording unit 54, the content data playback unit 55, and the output unit 56. The operation control unit 62 includes input devices such as various switches or levers. If a user inputs information by operating one or more input devices, the operation control unit 62 supplies the input information to the system controller 61.

FIG. 3 is a block diagram showing an example of a detailed implementation of the system controller 61 shown in FIG. 2.

As shown in FIG. 3, the system controller 61 includes a receive controller 91, a write controller 92, a read controller 93, a playback controller 94, an output controller 95, a metadata recording unit 96, a metadata manager 101, a content metadata updating unit 111, a record start time information generator 112, a relative time information generator 113, a stream playback control table generator 114 and a relative time information correction unit 115.

The receive controller 91 controls the receiving unit 52 in accordance with a command input by a user by operating the operation control unit 62. The receive controller 91 controls a tuner disposed in the receiving unit 52 to receive a television signal with a frequency specified by the user.

The write controller 92 controls the demultiplexer 53 and the content data recording unit 54 to write a content (program) data. The read controller 93 controls the demultiplexer 53 and the content data recording unit 54 to read a content (program) data. The playback controller 94 controls the content data playback unit 55 to play back content data. The output controller 95 controls the output unit 56 to output content data.

The read controller 93 controls the content data recording unit 54 to read content data recorded in the content data recording unit 54 from a read start position and supply the read content data to the demultiplexer 53. The read controller 93 also controls the demultiplexer 53 to divide the content data into the image data 71, the audio data 72, and the GUI data 73, and supply them to the content data playback unit 55. The playback controller 94 controls the content data playback unit 55 to play back the supplied data starting from a playback start position, and supply the played-back content to the output unit 56. The output controller 95 controls the output unit 56 to output the content.

At a playback end position, the playback controller 94 also controls the content data playback unit 55 to end the playback of the content, and the output controller 95 controls the output unit 56 to end the outputting of the content. If the playback and outputting of the content are ended, the read controller 93 controls the content data recording unit 54 to end the reading of the content data at a content read end position>.

The metadata recording unit 96 includes, for example, a storage medium such as a hard disk or a flash memory and a control mechanism for controlling the storage medium, and the metadata recording unit 96 records various metadata supplied from the demultiplexer 53 via the metadata manager 101. For example, the metadata recording unit 96 records content metadata 121, segment metadata 122, stream playback control table 123 and other associated meta data 124. The details of these data will be described later.

The metadata manager 101 manages control metadata based on which to manage the content data. For example, the metadata manager 101 supplies metadata received from the demultiplexer 53 to the metadata recording unit 96 to record it therein. The metadata manager 101 also supplies metadata to the content metadata updating unit 111, the record start time information generator 112, the relative time information generator 113, the stream playback control table generator 114, and/or the relative time information correction unit 115, as required, and the metadata manager 101 supplies metadata received from some of the content metadata updating unit 111, the record start time information generator 112, the relative time information generator 113, the stream playback control table generator 114, and/or the relative time information correction unit 115 to the metadata recording unit 96 to record the metadata therein. Depending on the content of the metadata, the metadata manager 101 controls the write controller 92 or the read controller 93 to read or write content data.

Based on the information supplied from the metadata manager 101, the content metadata updating unit 111 updates the content metadata 121 by adding information associated with a record start position of content data to the content metadata 121.

The record start time information generator 112 generates record start time information indicating a record start time of content data and supplies it to the metadata manager 101.

Based on the information supplied from the metadata manager 101, the relative time information generator 113 generates relative time information indicating a relative time with reference to the record start time and supplies it to the metadata manager 101. The stream playback control table generator 114 generates a stream playback control table 123 based on the information supplied from the metadata manager 101, and supplies it to the metadata manager 101. The relative time information correction unit 115 corrects the value of the relative time information based on the information supplied from the metadata manager 101 and supplies the corrected relative time information to the metadata manager 101.

Although in the example described above, the content data recording unit 54 for recording content data and the metadata recording unit 96 for recording metadata are configured as separate units, the content data recording unit 54 and the metadata recording unit 96 may be integrated in a single recording unit, and content data and metadata may be recorded in the same recording area.

Metadata recorded in the metadata recording unit 96 is described in further detail below.

FIG. 4 shows an example of a format of the content metadata 121 shown in FIG. 3. As shown in FIG. 4, the content metadata 121 is table information indicating the relationship among a plurality of items of information associated with a content. The content metadata 121 includes program guide data 121A indicating content of a program and record start position information 121B indicating a position, in a recording area of the content data recording unit 54, of the start of each content data. In each column of the content metadata 121, one item of information is described. In each row of the content metadata 121, information associated with one program (content) is described.

The program guide data 121A includes information associated with a program (content) in terms of a title, one or more performers, a summary, and/or a genre. The program guide data 121A is supplied as metadata of content data from a broadcast station.

The record start position information 121B is information indicating a recording position at which the first data of each program (content) recorded in the content data recording unit 54 is recorded. This information is supplied from the metadata manager 101 that controls the write controller 92.

That is, the content metadata updating unit 111 shown in FIG. 3 updates content metadata by adding the record start position information 121B supplied from the metadata manager 101 to the program guide data 121A supplied from a broadcast station, as shown in FIG. 4.

FIG. 5 shows an example of a format of segment metadata 122 shown in FIG. 3.

As shown in FIG. 5, the segment metadata 122 is table information indicating the relationship among a plurality of items of information associated with a segment. In each column of the segment metadata 122, one item of information is described. In each row of the segment metadata 122, information associated with one segment is described.

The segment refers to a unit used when a range of content data is represented. Each segment may have an arbitrary length, and there is no particular restriction on the length of the segment. However, in general, each segment has a length which is not equal to the length of a program (content). For example, a segment may be a part of a program (content) or may include a range over a plurality of programs. More specifically, for example, a segment may include data of a particular scene included in a program (program).

Use of segments as units makes it possible for the digital broadcast television receiver 31 to handle content data in units of segments rather than in units of programs (contents).

The segment metadata 122 includes three items, that is, an ID that is identification information identifying each segment, attribute information indicating an attribute of each segment, and relative time information of each segment with respect to the start position of a program (content).

The attribute information indicates an attribute of each segment. For example, in the case of a news program content, the content is divided into segments corresponding to news topics, and attribute information indicating categories of news, such as "economy" or "sports", is described for each segment. The relative time information indicates a time as measured with respect to the start of a program, and is used to indicate a temporal position in a program for each segment. The relative time information may be defined for the start position of each segment or may be for another position other than the start position, such as the end position of each segment. The relative time information may be a combination of two or more pieces of time information. For example, the relative time information may be a combination of relative time information indicating the temporal start position of a segment and relative time information indicating the temporal end position of the segment.

The segment metadata 122 is supplied as metadata of content data from a broadcast station.

FIG. 6 shows an example of a format of the stream playback control table 123 shown in FIG. 3.

The stream playback control table 123 shown in FIG. 6 is table information used to control playback of a content. The stream playback control table 123 indicates the correspondence between relative time information and relative position information for each GOP (Group Of Pictures) including a plurality of pictures of content data decompressed from data compressed according to the MPEG2-TS standard.

The relative time information indicates the time (relative time) of the first picture of each GOP, as measured with respect to the start of recorded data (record start time), and as represented in days, hours, minutes, and seconds or in the number of frames (pictures). The relative position information indicates the relative position of the first picture of each GOP, as measured with respect to the start of recorded data (record start position), and as represented in bytes (indicating the amount of data from the record start position to the first picture of each GOP).

That is, the stream playback control table 123 is mapping information indicating the correspondence between the data position of the recorded data as measured from the start of the recorded data and the recording position in the recording area as measured from the first recording position. This stream playback control table 123 is referred to when stream data is played back not in an original order but in a different order as in a case in which data is played back in a fast-forward mode or only a particular part of data is played back. The stream playback control table 123 is generated by the stream playback control table generator 114 shown in FIG. 3.

Figure 7:
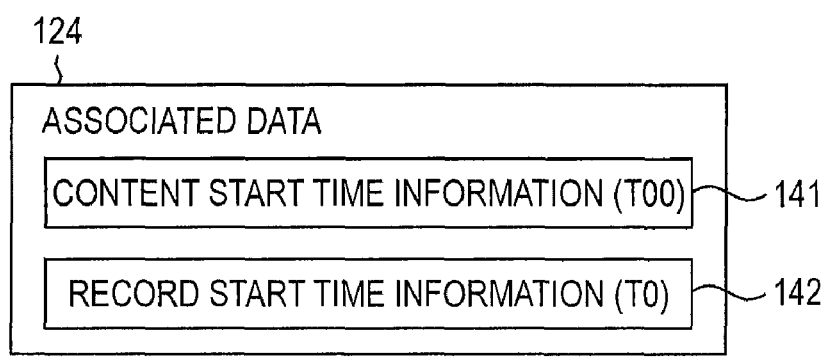
FIG. 7 shows an example of a format of associated data shown in FIG. 3.

FIG. 7 shows an example of a format of associated data 124 shown in FIG. 3.

The associated data 124 includes metadata associated with content data other than the above-described metadata. In the example shown in FIG. 7, the associated data 124 includes content start time information (T00) 141 and record start time information (T0) 142.

The content start time information (T00) 141 indicates a start time of a program (content) using a PTS (Presentation Time Stamp) value, and is supplied as metadata associated with content data from a broadcast station. The record start time information (T0) 142 indicates a record start time of the program (content) data using a PTS value, and is generated by the record start time information generator 112 shown in FIG. 3.

PTS refers to a time stamp inserted in each elementary stream with a packet size (a TS packet) by a MPEG-2 encoder so that a decoder can adjust synchronization of elementary streams based on the PTS. The PTS is used to indicate an access unit of video/audio content to be played back. In the decoder, when the PTS value becomes equal to an STC (System Time Clock) value obtained by counting a 27-MHz clock in 43 bits, an access unit corresponding to the PTS value is decoded (played back). Note that each TS packet includes a PCR (Program Clock Reference), and the decoder reproduces the STC from the PCR in the decoding process.

The digital broadcast television receiver 31 shown in FIG. 2 is capable of playing back and outputting content data based on segments in a manner different from a manner in which a program is broadcast from a broadcast station. This playback mode is referred to as a segment playback mode.

In the segment playback mode, as described above, content data is played back in units of segments. In a normal television broadcast mode, a television receiver continuously receives video and audio signals and simply plays back the video and audio signals as received (in a linear mode). In contrast, in the segment playback mode, video and audio signals of a part of a program are selectively played back (nonlinearly) in accordance with a selection command issued by a viewer. The segment playback mode makes it possible for a broadcast station to provide new services such as a service that allows a user to select one of many topics of a news program, a service that allows a user to view a digested version of a sport program including only highlight scenes, and/or a service that allows a user to search video database by a keyword for a desired program from a plurality of programs and view only a desired part of the program in units of segments.

Figure 8:
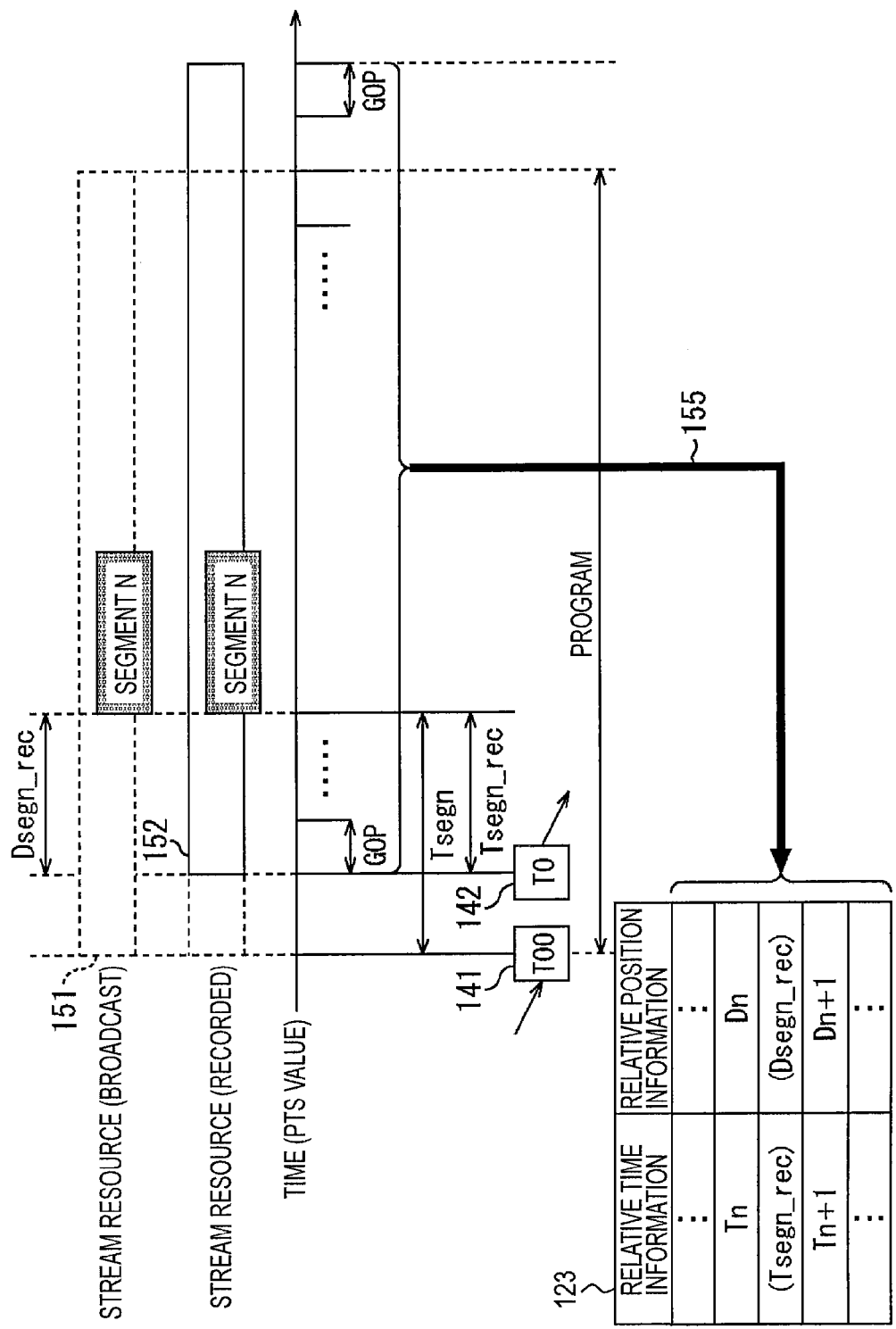
FIG. 8 is a diagram showing a process of receiving a television signal of a program broadcast from a broadcast station and recording the program.

A process performed in the playback mode by the digital broadcast television receiver 31 shown in FIG. 2 is described below. FIG. 8 shows a manner in which a television signal of a program (content) broadcast from a broadcast station is received is recorded.

In FIG. 8, a stream resource 151, which is data of a program (content) broadcast from a broadcast station, is received by the receiving unit (FIG. 2) and recorded as a stream resource 152 by the content data recording unit 54 via the demultiplexer 53 As shown in FIG. 8, there is a difference in temporal position between the stream resource 152 and the stream resource 151, and there is a corresponding difference in content. That is, the content start time information (T00) 141 indicating the time, in the PTS value, of the start of the stream resource 151 is not equal to the record start time information (T0) 142 indicating the time, in the PTS value, of the start of the stream resource 152.

The record start time information (T0) 142 is generated by the record start time information generator 112 (FIG. 3) of the system controller 61 in response to starting recording the stream resource 152. The stream playback control table generator 114 of the system controller 61 generates a stream playback control table 123 associated with the stream resource 152 (as represented by an arrow 155). In the stream playback control table 123 associated with the stream resource 152, the relative time information of the start of a segment N is represented as Tsegn_rec (Tn<Tsegn_rec<Tn+1), and the relative position information is represented as Dsegn_rec (Dn<Dsegn_rec<Dn+1).

Figure 9:
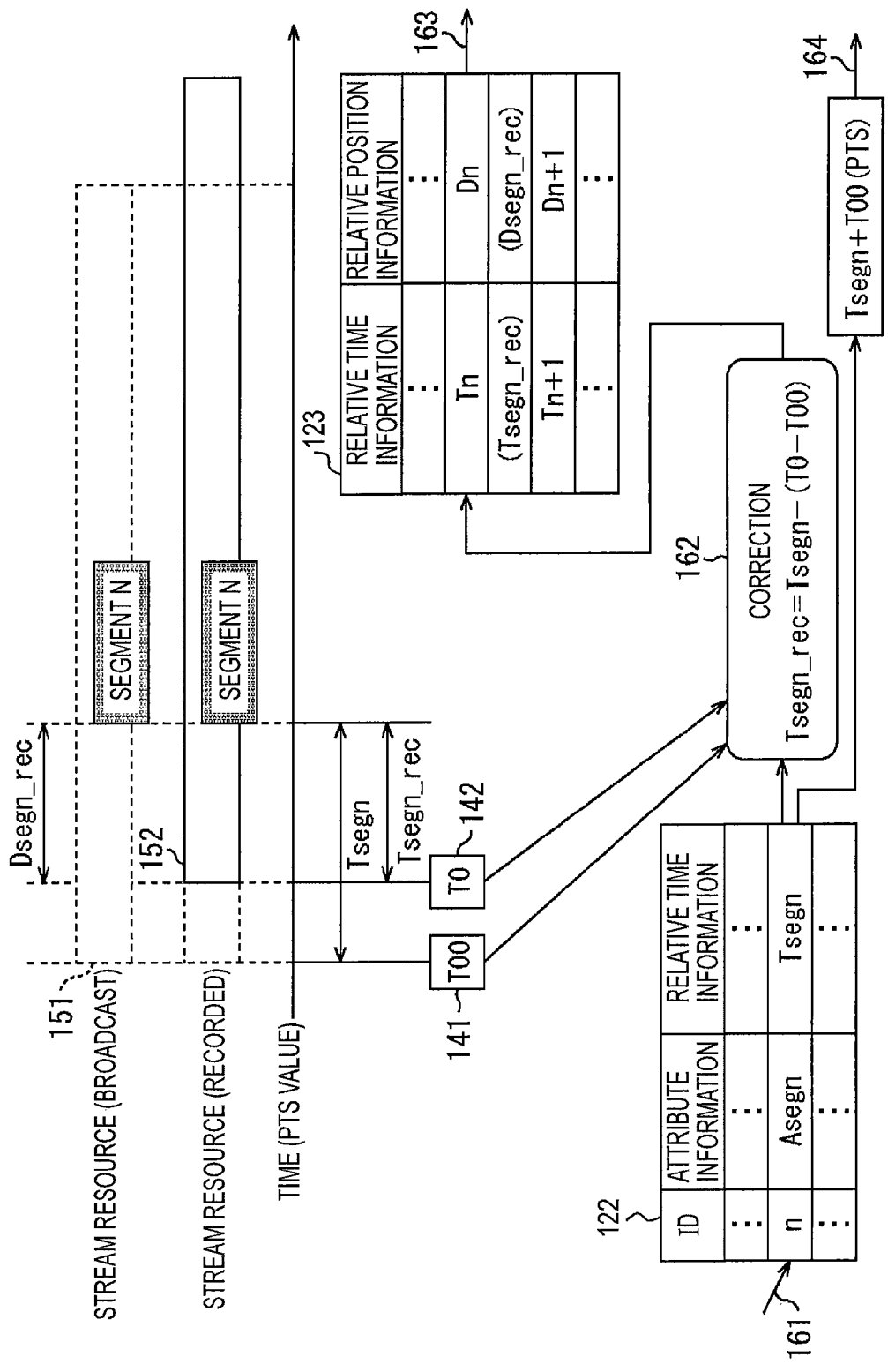
FIG. 9 is a diagram showing a segment playback process.

Now, referring to FIG. 9, a process of playing back a stream resource recorded in the above-described manner in the segment playback mode is described.

If a user specifies a segment based on attribute information, the metadata manager 101 examines the segment table to identify the segment that corresponds to the specified attribute information. In the example shown in FIG. 9, the metadata manager 101 identifies that a segment having an ID of "n" corresponds to attribute information Asegn specified by the user. The metadata manager 101 supplies relative time information Tsegn of the identified segment together with the content start time information (T00) 141 and the record start time information (T0) 142 to the relative time information correction unit 115.

The relative time information correction unit 115 performs a correction process 162 using the relative time information (Tsegn), the content start time information (T00) 141, and the record start time information (T0) 142 to produce corrected relative time information (Tsegn_rec). More specifically, the relative time information correction unit 115 corrects the relative time information according to the following equation (1).

$$Tsegn\_rec = Tsegn - (T0 - T00) \qquad (1)$$

The corrected relative time information (Tsegn_rec) acquired via the correction process 162 is supplied to the metadata manager 101. The metadata manager 101 examines the stream playback control table 123 to detect relative position information (Dsegn_rec) corresponding to the corrected relative time information (Tsegn_rec). In the example shown in FIG. 9, as described above with reference to FIG. 8, the relative time information Tsegn_rec is within the range Tn<Tsegn_rec<Tn+1, and thus the metadata manager 101 identifies the relative time information Tn of the start position of a GOP including that position. The metadata manager 101 reads relative position information Dn corresponding to the relative time information Tn and supplies it to the controller 93 (as shown by an arrow 163), which controls reading of the segment N in accordance with the supplied information.

Thus, via the process described above, the read controller 93 acquires the relative time information with respect to the start position of the recorded stream resource 152 as shown in the uppermost row shown in FIG. 9, and the read controller 93 starts reading the segment N correctly from the start position of the segment N.

The metadata manager 101 also supplies the relative time information (Tsegn) and the content start time information (T00) 141 to the playback controller 94 via the read controller 93 (as shown by an arrow 164). The playback controller 94 monitors the PTS of the content data and controls the content data playback unit 55 to start playback of the content from a position (playback start position) at which the PTS of the content data is equal to Tsegn+T00. The output controller 95 controls the output unit 56 to output the played-back content. Thus, the playback controller 94 and the output controller 95 can play back and output the segment N precisely from the start position thereof thereby allowing a user to view the segment N.

The read controller 93, the playback controller 94, and the output controller 95 control ending of reading, playing-back, and outputting of the content such that the playback and outputting of the segment N are ended precisely at the end position of the segment N, and subsequently the reading of the segment N is also ended.

Thus, a user can view the program precisely from the start to the end of the segment N.

The processing flow is described in further detail below with reference to specific examples.

First, referring to a flow chart shown in FIG. 10, a process of receiving and recording a content is described.

For example, if a user issues a record start command or if a preprogrammed record start time is reached, the system controller 61 starts a process of receiving and recording a content.

In a first step S1 in the content receiving and recording process, the receive controller 91 controls the receiving unit 52 to start receiving content data. Under the control of the receive controller 91, the receiving unit 52 receives television signals via the antenna 51 and extracts program (content) data broadcast from a specified broadcast station. The extracted program (content) data is supplied to the demultiplexer 53.

In step S2, the write controller 92 in the system controller 61 controls the demultiplexer 53 to extract metadata from the acquired content data and supply the extracted metadata to the metadata manager 101 in the system controller 61. Under the control of the write controller 92, the demultiplexer 53 supplies the metadata extracted from the content data to the metadata manager 101. If the metadata manager 101 receives the metadata, the metadata manager 101 supplies the received metadata to the content metadata updating unit 111. The metadata manager 101 also acquires information associated with a record start position of the content data corresponding to the metadata from the content data recording unit 54 via the write controller 92 and supplies the acquired information together with the content metadata to the content metadata updating unit 111. In step S3, the content metadata updating unit 111 updates the content metadata by adding the record position information of the start of the content data to the content metadata.

If the metadata manager 101 acquires the updated content metadata, then in step S4, the metadata manager 101 supplies the acquired metadata to the metadata recording unit 96 to record it therein. In step S5, the write controller 92 controls the demultiplexer 53 and the content data recording unit 54 to start recording the content data including the image data 71, the audio data 72, and the GUI data 73. Under the control of the write controller 92, the content data recording unit 54 records the content data supplied from the demultiplexer 53.

In step S6, the record start time information generator 112 detects the PTS value of a picture first recorded in the content data recording unit 54 via the metadata manager 101 and the write controller 92, and produces record start time information 142 based on the detected PTS value. The resultant record start time information 142 is supplied to the metadata manager 101. The metadata manager 101 supplies the received record start time information 142 to the metadata recording unit 96 to record it as the associated data 124.

In step S7, the write controller 92 monitors the image data (or information associated with it) being recorded by the content data recording unit 54 to determine whether the current image data being recorded is a first picture of a GOP. If it is determined that the current image data is a first picture, then the relative time information generator 113 advances the process to step S8 to produce relative time information with reference to the record start time information. In step S9, the metadata manager 101 acquires the relative time information from the relative time information generator 113 and also acquires relative position information with reference to the start position from the write controller 92, The metadata manager 101 produces the stream playback control table 123 indicating the correspondence between the relative time information and the relative position information. In a case in which there is already an existing stream playback control table 123, the metadata manager 101 adds the information indicating the correspondence to the existing stream playback control table 123. After step S9 is completed, the metadata manager 101 advances the process to step S10.

In the case in which it is determined in step S7 that the current picture is not the first picture of the GOP, the metadata manager 101 advances the process to step S10 without performing steps S8 and S9.

In step S10, the metadata manager 101 determines whether to end the process of recording the content data. For example, if the end of the program (content) has not yet been reached, and thus if it is determined that the recording of the content data should not be ended, the process returns to step S7 to repeat the above-described process from step S7.

By performing steps S7 to S10 repeatedly, the metadata manager 101 produces the stream playback control table 123. If the end of the program (content) is reached or a record end command is issued by a user and thus if it is determined in step S10 that the recording of the content data should be ended, the system controller 61 advances the process to step S11.

In step S11, the receive controller 91 and the write controller 92 end the receiving and recording of the content data by controlling related parts. Thereafter, in step S12, the metadata manager 101 supplies the generated stream playback control table 123 to the metadata recording unit 96 to record it.

If step S12 is completed, the system controller 61 ends the process of receiving and recording the content.

By performing the process of receiving and recording the content in the above-described manner, the digital broadcast television receiver 31 acquires, in addition to the information supplied from the broadcast station, the record start time information 142 and the stream playback control table 123 associated with the recorded stream source and records the acquired the record start time information 142 and the stream playback control table 123. This makes it possible for the digital broadcast television receiver 31 to precisely present the specified content to a user.

Next, referring to a flow chart shown in FIG. 11, a segment playback process is described below.

If a user issues a command to play back a specified segment, the system controller 61 performs the segment playback process.

In a first step S31 of the segment playback process, the metadata manager 101 reads necessary metadata from the metadata recording unit 96. In step S32, based on the read content metadata, the metadata manager 101 identifies the content specified by the user to be played back and also identifies the position where the content is recorded.

If the content data is identified, then in next step S33, the metadata manager 101 further identifies the relative time information of the start of the segment corresponding to the specified attribute, based on the read segment metadata. If the relative time information of the segment is identified, the metadata manager 101 supplies the relative time information, the content start time information 141, and the record start time information 142 to the relative time information correction unit 115. In step S34, based on the content start time information 141 and the record start time information 142, the relative time information correction unit 115 corrects the identified relative time information in accordance with equation (1) described earlier, and returns the corrected value to the metadata manager 101. If the metadata manager 101 receives the corrected relative time information, then in step S35, the metadata manager 101 calculates the read start position based on the stream playback control table 123.

Similarly, in step S36, the metadata manager 101 identifies the relative time information of the end of the segment corresponding to the specified attribute, based on the segment metadata, and the metadata manager 101 supplies the relative time information, the content start time information 141, and the record start time information 142 to the relative time information correction unit 115. In step S37, based on the content start time information 141 and the record start time information 142, the relative time information correction unit 115 corrects the identified relative time information in accordance with equation (1) described earlier, and returns the corrected value to the metadata manager 101. If the metadata manager 101 receives the corrected relative time information, then in step S38, the metadata manager 101 calculates the read end position based on the stream playback control table 123.

If the read start position and the read end position are determined in the above-described manner, the read controller 93 acquires the information associated with the read start position and the read end position from the metadata manager 101, and in step S39, the read controller 93 controls the demultiplexer 53 and the content data recording unit 54 to start reading the content data from the read start position. The read content data is supplied to the content data playback unit 55.

In step S40, the playback controller 94 controls the content data playback unit 55 to monitor the PTS of the content data supplied from the demultiplexer 53 and start playback of the content from the playback start position (the start of the segment identified in step S33) at which the PTS value is equal to Tsegn+T00. The output controller 95 controls the output unit 56 to output the played-back content. In step S41, the playback controller 94 and the output controller 95 end the playing back and outputting of the content at the playback end position according to the PTS. In step S42, the read controller 93 ends the reading of the content data at the read end position, and ends the segment playback process.

In the segment playback process, as described above, use of the stream playback control table 123 associated with the recorded content data allows the digital broadcast television receiver 31 to correctly identify the start position and the end position of the specified segment, start reading the segment including the start and end positions, end reading the segment at the end position, start playing back and outputting the segment from the beginning of the segment, and end playing back and outputting the segment at the end of the segment, and thus allowing a user to view the exact specified content.

As described above, the digital broadcast television receiver 31 generates a stream playback control table 123 associated with recorded content data, and plays back a segment based on the stream playback control table 123. Use of the stream playback control table 123 makes it possible to easily determine corrected relative time information to be actually employed from relative time information described in a segment metadata. It is possible to determine corrected relative time information regardless of whether the record start time is before or after the content start time. Thus, the digital broadcast television receiver 31 is capable of easily playing back a specified segment.

Content data broadcast from a broadcast station may be in an encrypted form. Some digital broadcast stations broadcast program data in an encrypted form to allow only authorized users to view programs. The present invention is also applicable when broadcast program data is in an encrypted form.

Figure 12:
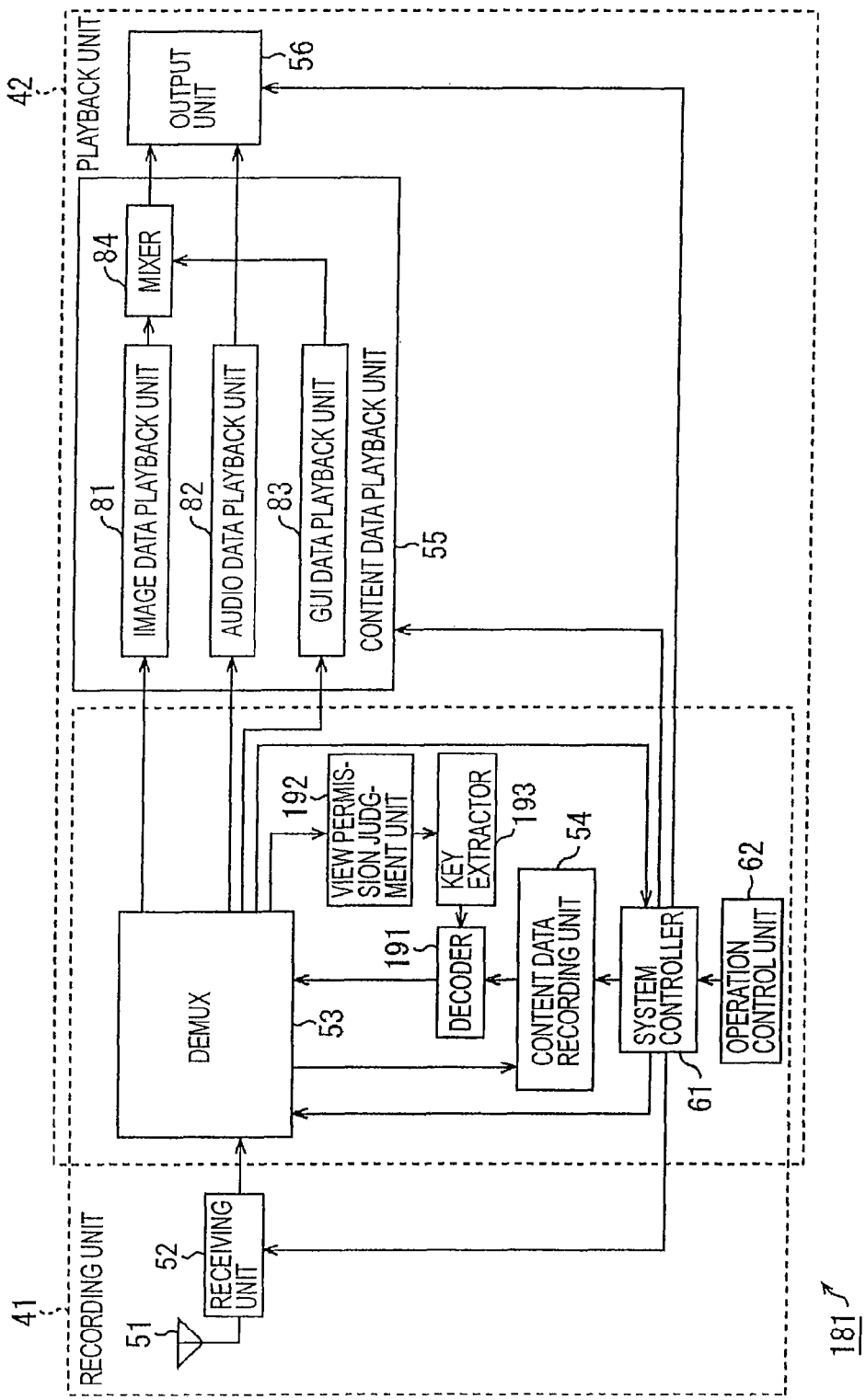
FIG. 12 is a block diagram showing a digital broadcast television receiver according to an embodiment of the present invention.
Figure 13:
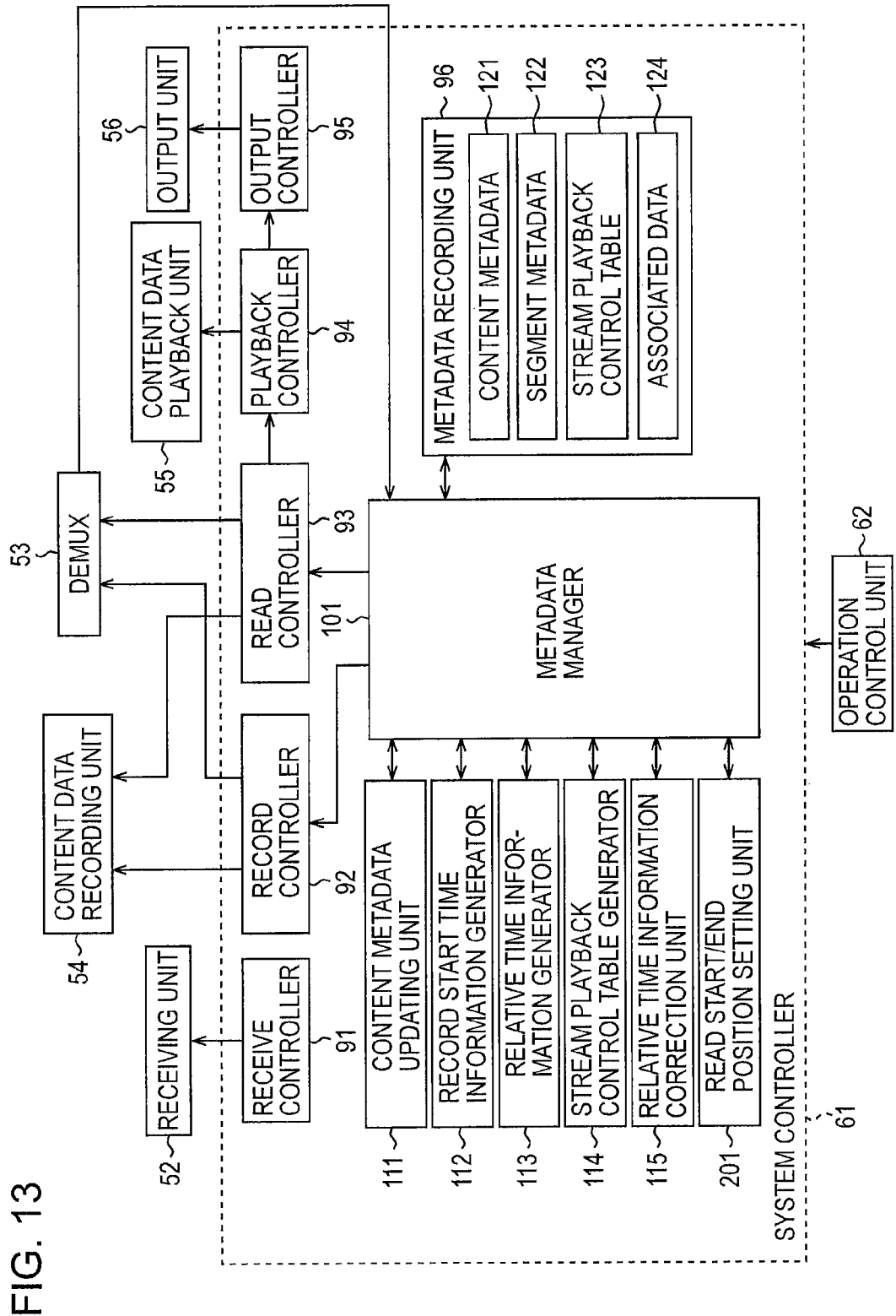
FIG. 13 is a block diagram showing an example of a detailed implementation of a system controller shown in FIG. 12.

FIG. 12 shows another embodiment of a digital broadcast television receiver according to the present invention. The digital broadcast television receiver 181 shown in FIG. 12 is basically similar in structure to the digital broadcast television receiver 31 except that the digital broadcast television receiver 181 additionally includes a decoder 191, a view permission judgment unit 192, and a key extractor 193.

In this case, encrypted content data received from a broadcast station is recorded in the content data recording unit 54. Using a decryption key supplied from the key extractor 193, the decoder 191 decrypts encrypted image data 71, audio data 72, and GUI data 73 read from the content data recording unit 54. The resultant decrypted image data 71, audio data 72, and GUI data 73 are supplied to the demultiplexer 53.

The encrypted content data supplied from the broadcast station includes a TS packet including an entitlement control message (ECM) including view entitlement information and a decryption key. If the demultiplexer 53 detects an ECM from the content data read from the content data recording unit 54, the demultiplexer 53 supplies the detected ECM to the view permission judgment unit 192. Based on the view entitlement information described in the supplied ECM, the view permission judgment unit 192 determines whether to permit viewing of the content. If it is determined that viewing of the content should be permitted, the view permission judgment unit 192 supplies the ECM to the key extractor 193. The key extractor 193 extracts the decryption key from the supplied ECM and supplies the extracted decryption key to the decoder 191. The decoder 191 decrypts the encrypted content data using the decryption key and supplies the decrypted content data to the demultiplexer 53.

The system controller 61 has a read start/end position setting unit 201 configured to set a data read start position and a data read end position such that a sufficient processing period time is provided to ensure that the sequence of processes described above, that is, the view entitlement judgment process performed by the view permission judgment unit 192, the decryption key extraction process performed by the key extractor 193, and the waiting for a first event of an ECM packet can be performed during the provided period time (that is, the processing period of time is set to be equal to or greater than a time (minimum necessary decoding time) necessary to complete the sequence of the above-described processes). When a segment is played back, the read start/end position setting unit 201 sets the data read start position and the data read end position depending on the position of the start of the segment such that the processing time provided for the decoding of the content data is equal to or greater than the minimum necessary decoding time.

Figure 14A:
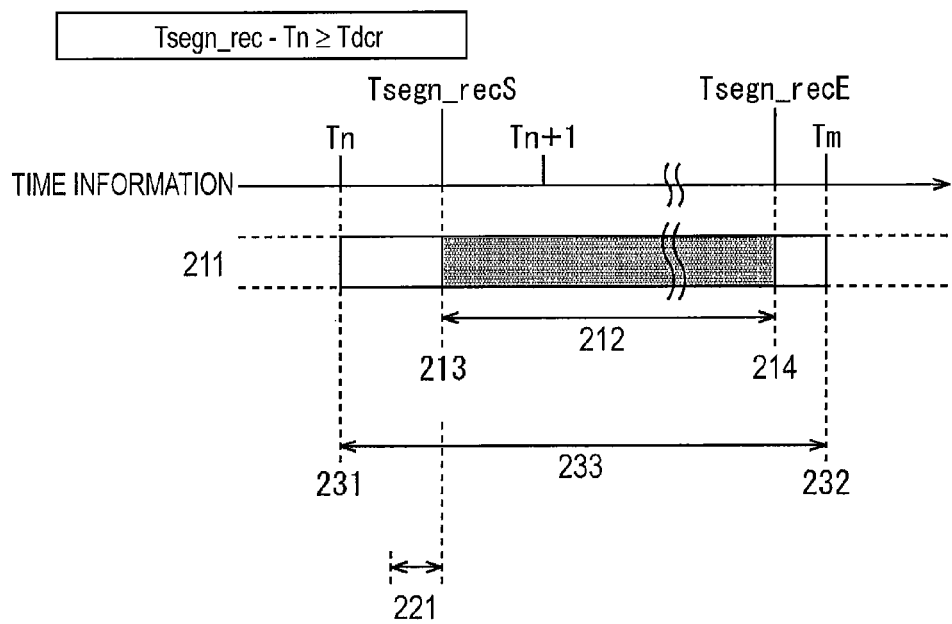
FIGS. 14A and 14B are diagrams showing a method of controlling a process so as to provide a decoding time equal to or longer than a minimum necessary decoding time.

Herein, as shown in FIG. 14A, let us assume that Tsegn_recS and Tsegn_recE are respectively given as a playback start position 213 and a playback end position 214 of a range 212, to be played back, of the stream resource 211. In this case, because Tsegn_recS is after the start position Tn of a GOP and before Tn+1, and because the period of time from Tn to Tsegn_recE (Tsegn_recE−Tn) is greater than the minimum necessary decoding time (Tdcr) 221, Tn is selected as a decode start position 231. A decode end position 232 is set at the end position Tm of the GOP such that the decode end position 232 is after Tsegn_recE. That is, in this example, when the range 212 to be played back is specified, the read start/end position setting unit 201 sets a range 233 to be decoded from the decode start position 231 to the decode end position 232. Note that the decoding range is also set in a similar manner in the previous examples described above with reference to FIGS. 1 to 11.

More specifically, the read controller 93 controls the reading process such that reading of the stream resource 211 is started from the start position Tn (decode start position 231) of the GOP including the playback start position 213, and such that decoding is started. The playback controller 94 plays back the stream resource 211 decoded in the above-described manner from the display start position 213, and the output controller 95 outputs it. If the display end position 214 is reached in the playback process and the outputting process, the playback controller 94 end the playback process and the output controller 95 ends the outputting process. The read controller 93 ends the process of reading and decoding the stream resource 211 at the end position Tm (decode end position 212) of a GOP including the display end position 214.

Figure 14B:
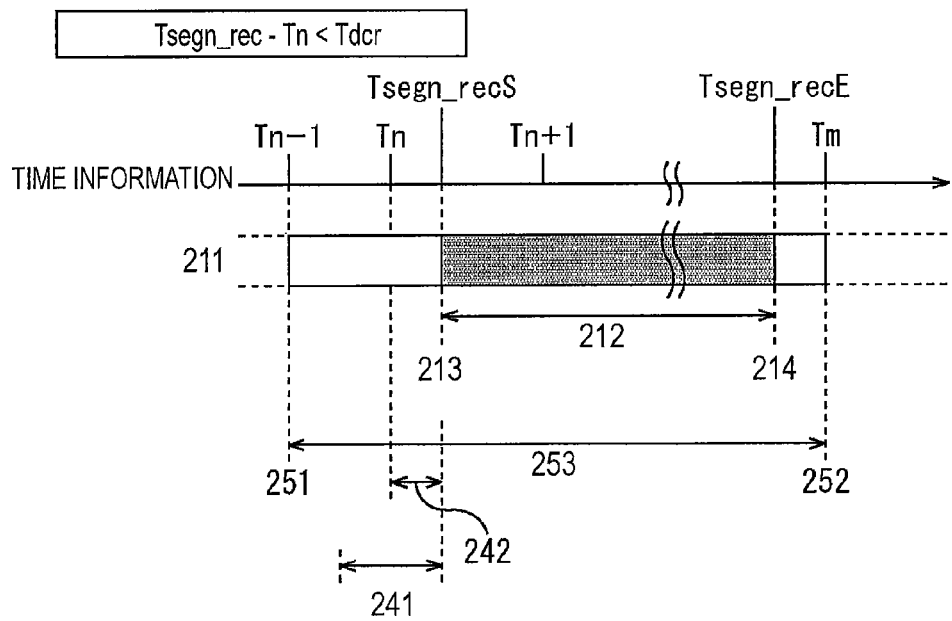

However, when the minimum necessary decoding time (Tdcr) 241 is longer than the period of time 242 from Tn Tsegn_recE (Tsegn_recE−Tn), if, as shown in FIG. 14B, the decode start position is set at Tn, the decoding process cannot be completed within the given period of time before the playback process starts. In such a case, to avoid the above problem, the read start/end position setting unit 201 sets the decode start position 251 at the start position Tn−1 of a previous GOP. That is, in this case, when the playback range 212 is specified, the read start/end position setting unit 201 sets a decoding range 253 from a decode start position 251 to a decode end position 252 (so as to have a greater range) such that the system controller 61 has a sufficient decoding period before the playback process starts and thus making it possible to perform the playback process in a highly reliable fashion.

More specifically, the read controller 93 controls the process such that reading of the stream resource 211 is started from the start position Tn−1 (decode start position 251) of a GOP immediately previous to a GOP including the playback start position 213, and such that decoding is started. The playback controller 94 plays back the stream resource 211 decoded in the above-described manner from the display start position 213, and the output controller 95 outputs it. If the display end position 214 is reached in the playback process and the outputting process, the playback controller 94 end the playback process and the output controller 95 ends the outputting process. The read controller 93 ends the process of reading and decoding the stream resource 211 at the end position Tm (decode end position 252) of a GOP including the display end position 214.

By setting the decoding time to be greater than the minimum necessary decoding time (Tdcr) depending on the situation in the above-described manner, the digital broadcast television receiver 181 can perform the playback process in a highly reliable manner so as to ensure that a user can view a specified content.

The segment playback process in such a situation is described in further detail below with reference to a flow chart shown in FIG. 15. In this segment playback process, the process is performed in a similar manner until the step of identifying the position information of the segment as described below with reference to FIG. 11.

In step S61, the metadata manager 101 reads necessary metadata from the metadata recording unit 96. In step S62, based on the read content metadata, the metadata manager 101 identify the content specified to be played back and also identifies the position where the content is recorded. In step S63, the metadata manager 101 further identifies the relative time information of the start of the segment corresponding to the specified attribute, based on the read segment metadata. In step S64, the relative time information correction unit 115 corrects the identified relative time information, based on the content start time information 141 and the record start time information 142. In step S65, the metadata manager 101 identifies the record position of the start of the specified segment from the corrected relative time information based on the stream playback control table.

Similarly, in step S66, the metadata manager 101 identifies the relative time information of the end of the segment corresponding to the specified attribute, based on the segment metadata. In step S67, the relative time information correction unit 115 corrects the identified relative time information, based on the content start time information 141 and the record start time information 142. In step S68, the metadata manager 101 identifies the record position of the end of the specified segment from the corrected relative time information based on the stream playback control table.

In step S69, the read start/end position setting unit 201 sets the read start position and the read end position, as will be described in further detail later.

In step S70, the read controller 93 controls the demultiplexer 53 and the content data recording unit 54 to start reading the content data from the read start position. The read content data is supplied to the decoder 191. If the demultiplexer 53 detects an ECM in the supplied content data, the demultiplexer 53 supplies the detected ECM to the view permission judgment unit 192. In step S71, based on the supplied ECM, the view permission judgment unit 192 determines whether to permit viewing of the specified content data. If it is determined that viewing should be permitted, the view permission judgment unit 192 supplies the ECM to the key extractor 193. In step S72, the key extractor 193 performs a decryption key extraction process to extract a decryption key from the supplied ECM and supplies the extracted decryption key to the decoder 191. Using a decryption key supplied from the key extractor 193, the decoder 191 decrypts the content data and supplies the decrypted content data to the demultiplexer 53. The demultiplexer 53 divides the content data into image data, audio data, and GUI data, and supplies the extracted data to the content data playback unit 55.

In step S74, in accordance with the PTS of the content data supplied to the content data playback unit 55, the playback controller 94 controls the playback process such that reading of the content data is started from the playback start position, and the played-back content is supplied to the output unit 56. The output controller 95 controls the output unit 56 to output an image and a sound/voice of the content data supplied from the content data playback unit 55, starting from the playback start position.

In step S75, If the playback end position is reached in the playback process performed by the content data playback unit 55, the playback controller 94 ends the playback of the content, and the output controller 95 ends the outputting of the content.

In step S76, the read controller 93 controls the content data recording unit 54 to end the reading of the content data at the read end position, and ends the segment playback process.

Figure 15:
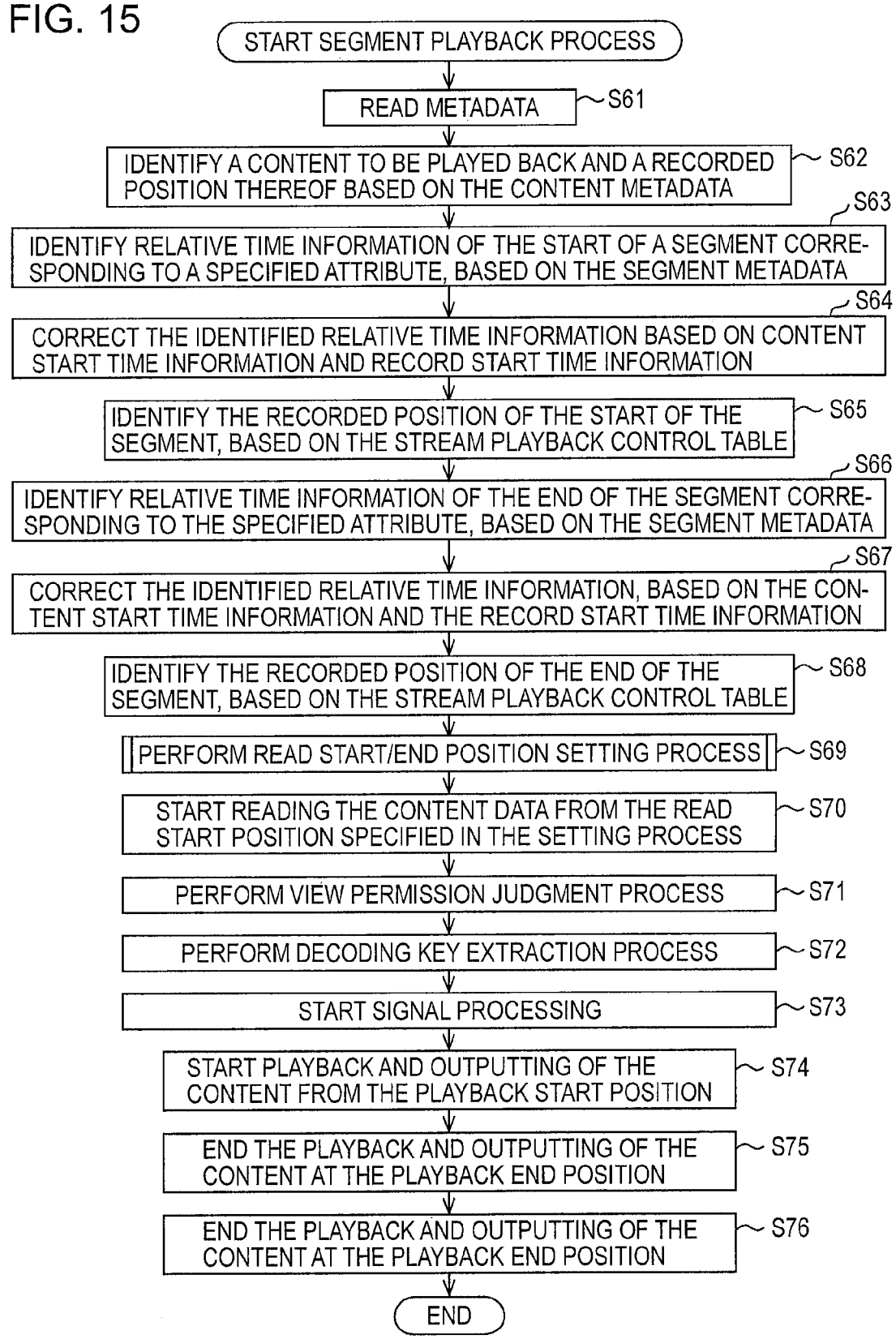
FIG. 15 is a flow chart showing another example of a segment playback process.
Figure 16:
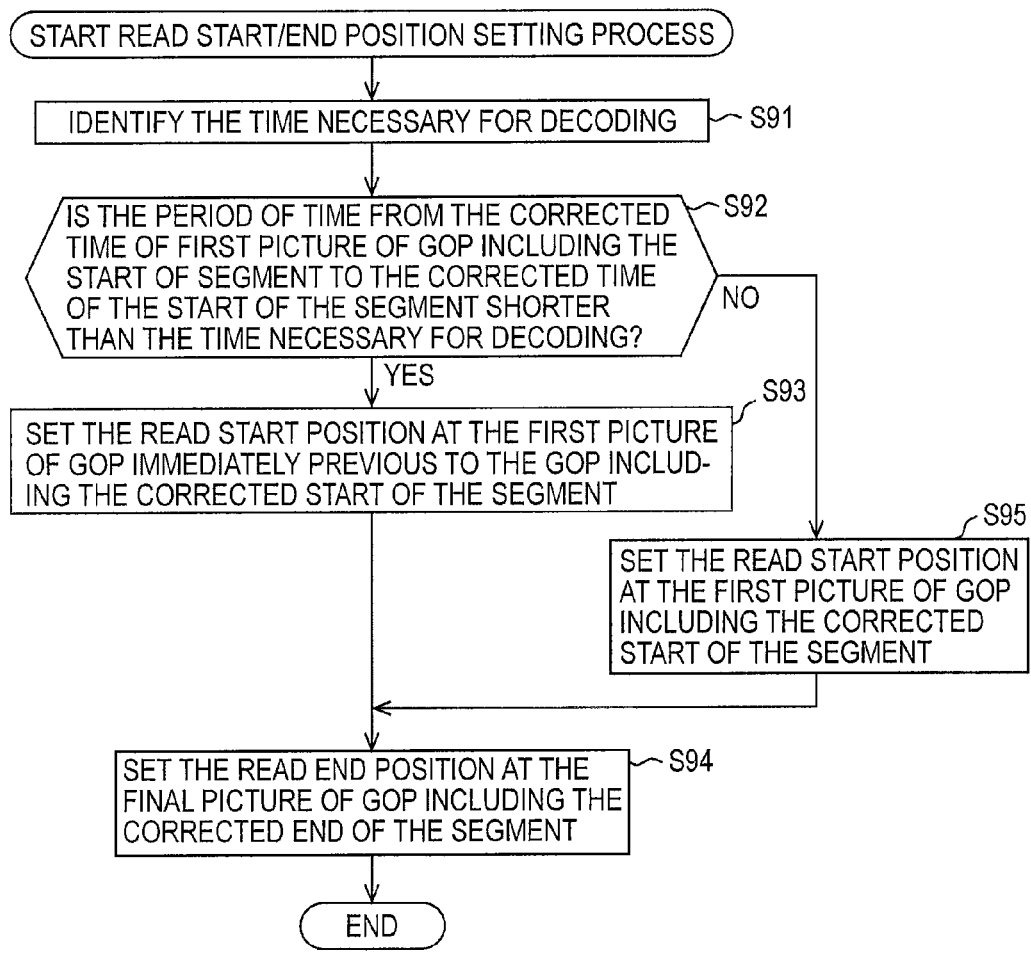
FIG. 16 is a flow chart showing, in detail, an example of a process of setting a read start position and a read end position.

Next, referring to a flow chart shown in FIG. 16, the details of the reading start/end position setting process performed in step S69 shown in FIG. 15 are described.

First, in step S91, the read start/end position setting unit 201 determines the minimum necessary decoding time, which is necessary for the decoder 191 to perform the decoding process. Thereafter, in step S92, the read start/end position setting unit 201 determines whether the period (Tsegn_recE−Tn) from the first picture of a GOP including the corrected start of the segment to the corrected start of the segment is shorter than the minimum necessary decoding time (Tdcr).

If it is determined that the period (Tsegn_recE−Tn) from the first picture of a GOP including the corrected start of the segment to the corrected start of the segment is shorter than the minimum necessary decoding time (Tdcr), the read start/end position setting unit 201 advances the process to step S93.

In step S93, the read start/end position setting unit 201 sets the read start position at the first picture of a GOP immediately previous to the GOP including the corrected start of the segment. In step S94, the read start/end position setting unit 201 sets the read end position at the last picture of a GOP including the corrected end of the segment. If the read end position is set, the read start/end position setting process is completed, and the process returns to step S70 shown in FIG. 15.

In the case in which it is determined in step S92 in FIG. 16 that the period (Tsegn_recE−Tn) from the first picture of a GOP including the corrected start of the segment to the corrected start of the segment is equal to or longer than the minimum necessary decoding time (Tdcr), the read start/end position setting unit 201 advances the process to step S95. In step S95, the read start/end position setting unit 201 sets the read start position at the first picture of a GOP including the corrected start of the segment. If step S95 is completed, the read start/end position setting unit 201 advances the process to step S94 to further perform the process.

As described above, when content data is in an encrypted form, by controlling the segment playback process such that a sufficient period of time is given to perform the decoding process, the system controller 61 can perform the playback process in a highly reliable manner such that the playback position is precisely controlled thereby ensuring that a user can view a specified content.

Figure 17A:
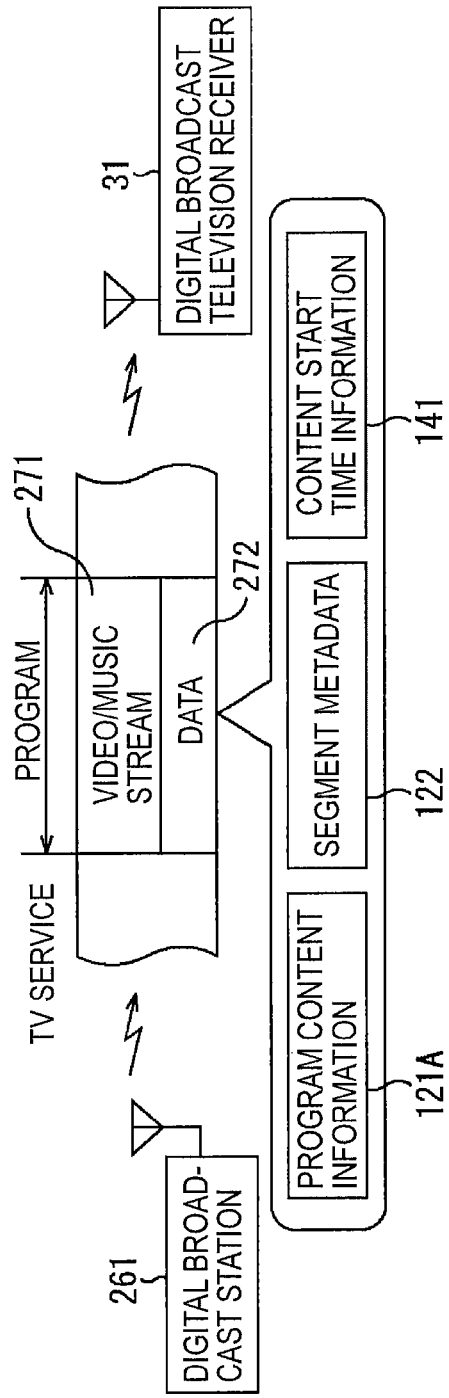
FIGS. 17A and 17B are diagrams showing examples of data broadcast together with a video/audio stream from a broadcast station.
Figure 17B:
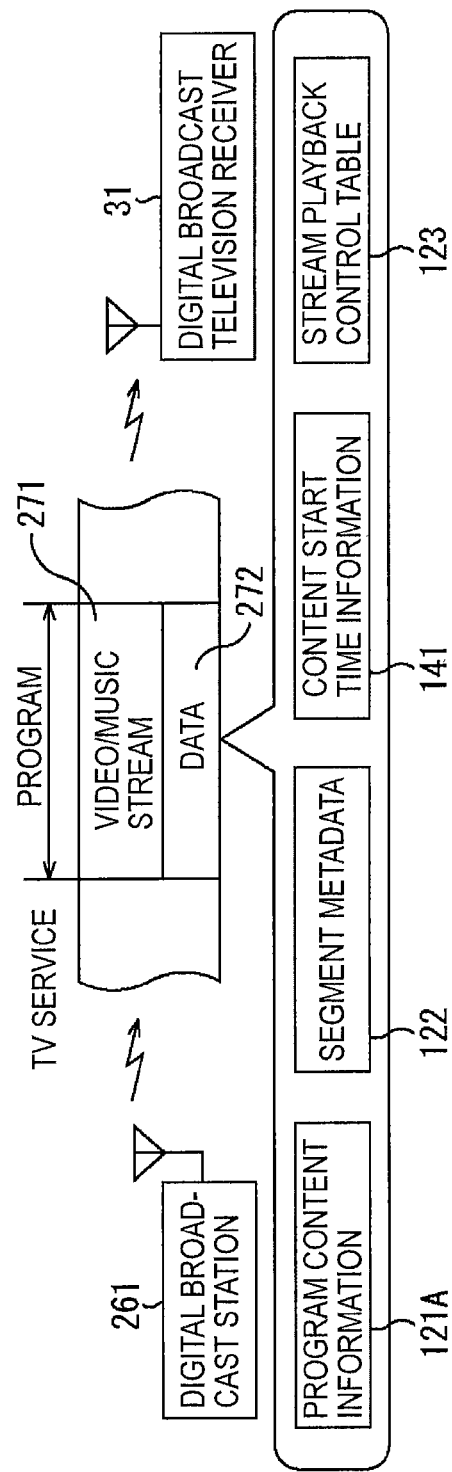

In the example described above with reference to FIG. 17A, the digital broadcast station 261 provides, together with the video/audio stream 271, data 272 including the program guide data 121A, segment metadata 122, and the content start time information 141 to the digital broadcast television receiver 31 (or 181). However, data supplies by digital broadcast station 261 is not limited to that in this example. For example, as shown in FIG. 17B, the data 272 supplied together with the video/audio stream 271 from the digital broadcast station 261 may include, in addition the above-described data, the stream playback control table 123.

In this case, the system controller 61 of the digital broadcast television receiver 31 controls the segment playback process in a manner different from the manner described above with reference to FIG. 3, and, as shown in FIG. 18, the system controller 61 includes an offset value calculator 281 and a relative position information correction unit 282 instead of the stream playback control table generator 114 and the relative time information correction unit 115.

The offset value calculator 281 calculates the offset value of the position information to be used to correct the relative position information in the segment playback process, as will be described in further detail later. The relative position information correction unit 282 corrects the relative position information based on the offset value calculated by the offset value calculator 281.

Figure 19:
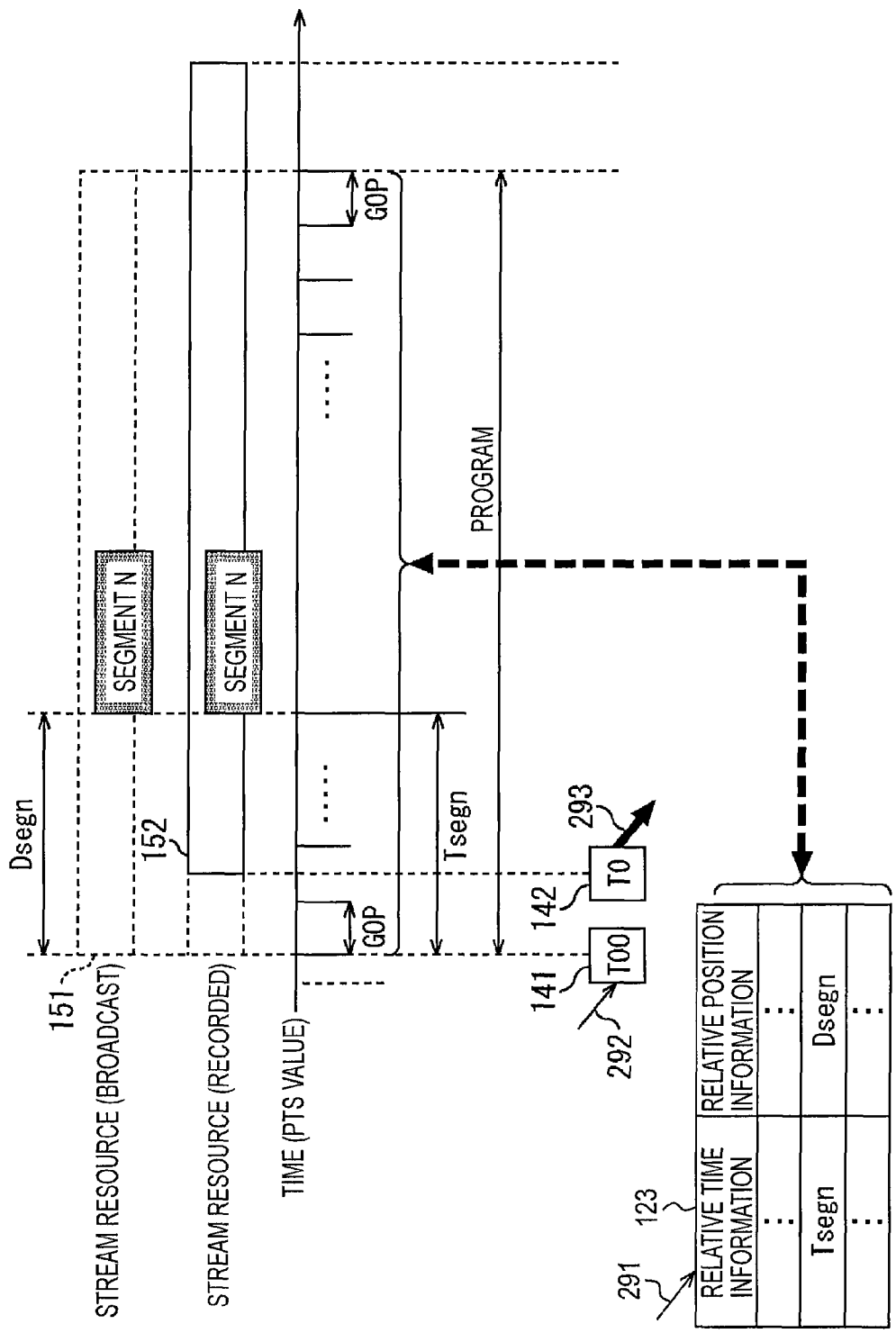
FIG. 19 a diagram showing another example of a process of receiving a television signal of a program broadcast from a broadcast station and recording the program.

In this case, the digital broadcast television receiver 31 performs the content receiving and recording process as described below with reference to FIG. 19 corresponding to FIG. 8.

The digital broadcast television receiver 31 acquires a stream playback control table 123 from a broadcast station (as shown by an arrow 291). The digital broadcast television receiver 31 also acquires content start time information (T00) 141 represented using PTS values from the broadcast station (as shown by an arrow 292). The digital broadcast television receiver 31 records the acquired information in the metadata recording unit 96. The digital broadcast television receiver 31 generates record start time information (T0) 142 represented using PTS values when the received stream resource 152 is recorded (as shown by an arrow 293).

That is, in this case, the stream playback control table 123 recorded in the metadata recording unit 96 includes information associated with the stream resource 151 as of the time when the stream resource 151 is broadcast. When the timing of starting recording of a stream resource is different from the program start timing of a program, the relative time information described in the stream playback control table 123 is not equal to the relative tine information with respect to the start of the stream resource 152 recorded in the content data recording unit 54.

Figure 20:
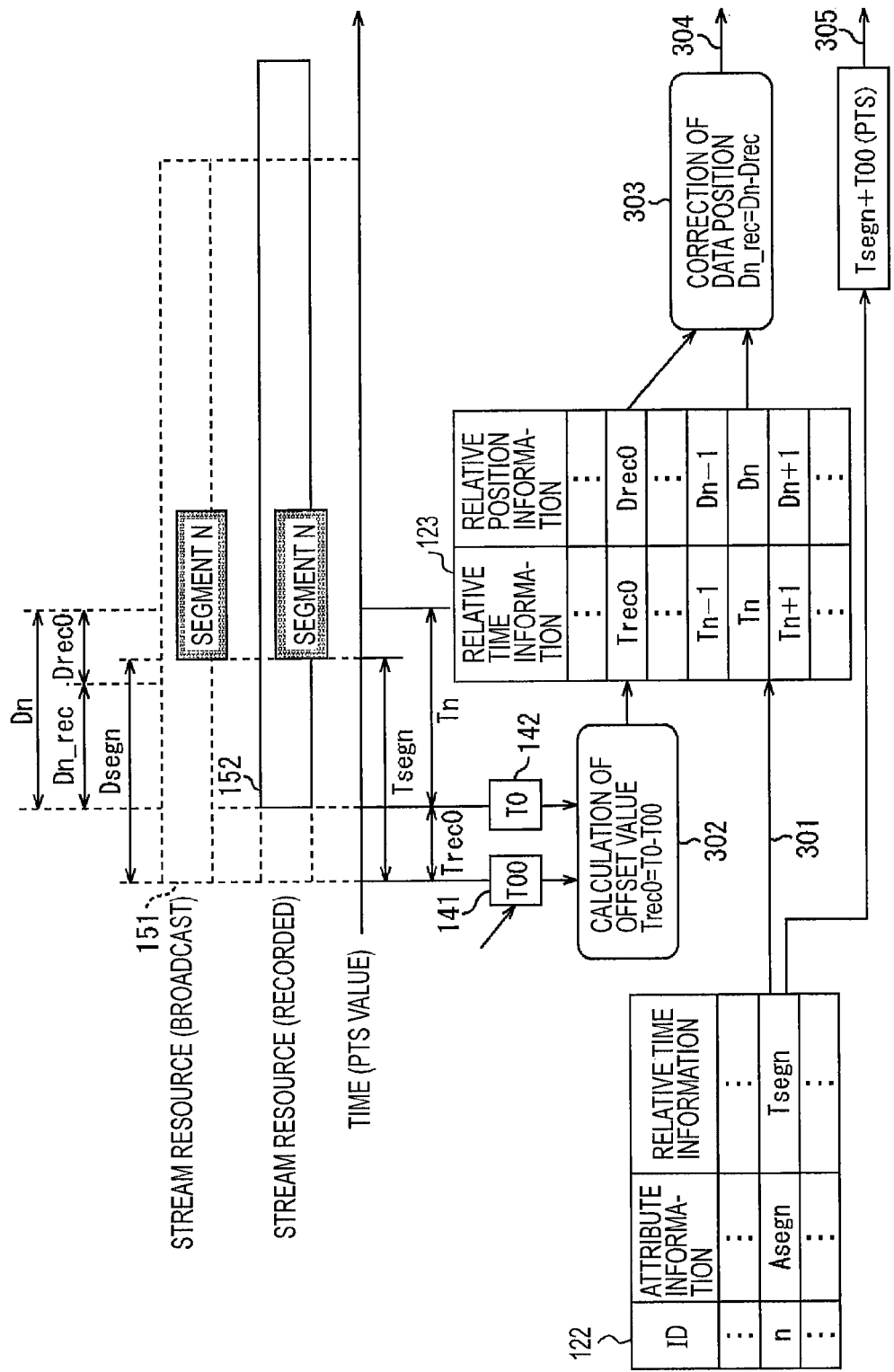
FIG. 20 is a diagram showing another example of a segment playback process.

The segment playback process is controlled as described below with reference to FIG. 20. First, the system controller 61 identifies a segment to be played back, based on a segment table 122 and further identifies a GOP corresponding to the relative time information of the start of the segment, based on the stream playback control table 123 (as shown by an arrow 301). The system controller 61 further identifies the relative position information Dn of that GOP, based on the stream playback control table 123. Thereafter, the system controller 61 performs an offset value calculation process 302 to calculate the offset value Trec0 using the content start time information 141 and the record start time information 142 in accordance with equation (2).

$$Trec0 = T0 - T00 \qquad (2)$$

The system controller 61 further calculates the relative position information Drec0 corresponding to the offset value Trec0 of the relative time information, based on the stream playback control table 123. The system controller 61 then performs a data position correction process 303 to correct the identified relative position information Dn using the calculated relative position information Drec0 according to equation (3) thereby acquiring corrected relative position information Dn_rec.

$$Dn\_rec = Dn - Drec0 \qquad (3)$$

The corrected relative position information Dn_rec indicates the relative position of the start of a GOP including the start of the segment N, with reference to the start of the recorded stream resource 152. The system controller 61 reads the segment N in accordance with the corrected relative position information Dn_rec (as shown by an arrow 304).

As described above, also in the case in which the stream playback control table 123 is supplied from the broadcast station, by controlling the playback process in the above-described manner, the system controller 61 can precisely identify the start position of the segment N and can control the reading process such that the segment N is read exactly from the start position. This makes it possible for the digital broadcast television receiver 31 so as to ensure that a user can view a specified content.

The metadata manager 101 also supplies the relative time information (Tsegn) and the content start time information (T00) 141 to the playback controller 94 via the read controller 93 (as shown by an arrow 305). The playback controller 94 controls the content data playback unit 55 to monitor the PTS of the read content data and start playback of the content from a position (playback start position) at which the PTS of the content data is equal to Tsegn+T00. The output controller 95 controls the output unit 56 to output the played-back content. Thus, the playback controller 94 can play back the segment N precisely from the start position and the output controller 95 can output it, thereby allowing a user to view the exact specified content.

The read controller 93, the playback controller 94, and the output controller 95 also control the ending of reading, playback, and outputting of the content such that playing back and outputting of the segment N are ended exactly at the specified end position, and then the reading of the content is ended.

Thus, when a user vies the content, the user is allowed to view only the exact segment N from its start to end.

The system controller 61 also controls the end position of the segment playback in a similar manner to the start position. That is, the system controller 61 performs a data position correction using the offset value to obtain corrected relative position information of the last picture of a GOP including the end position of the segment N.

Figure 21:
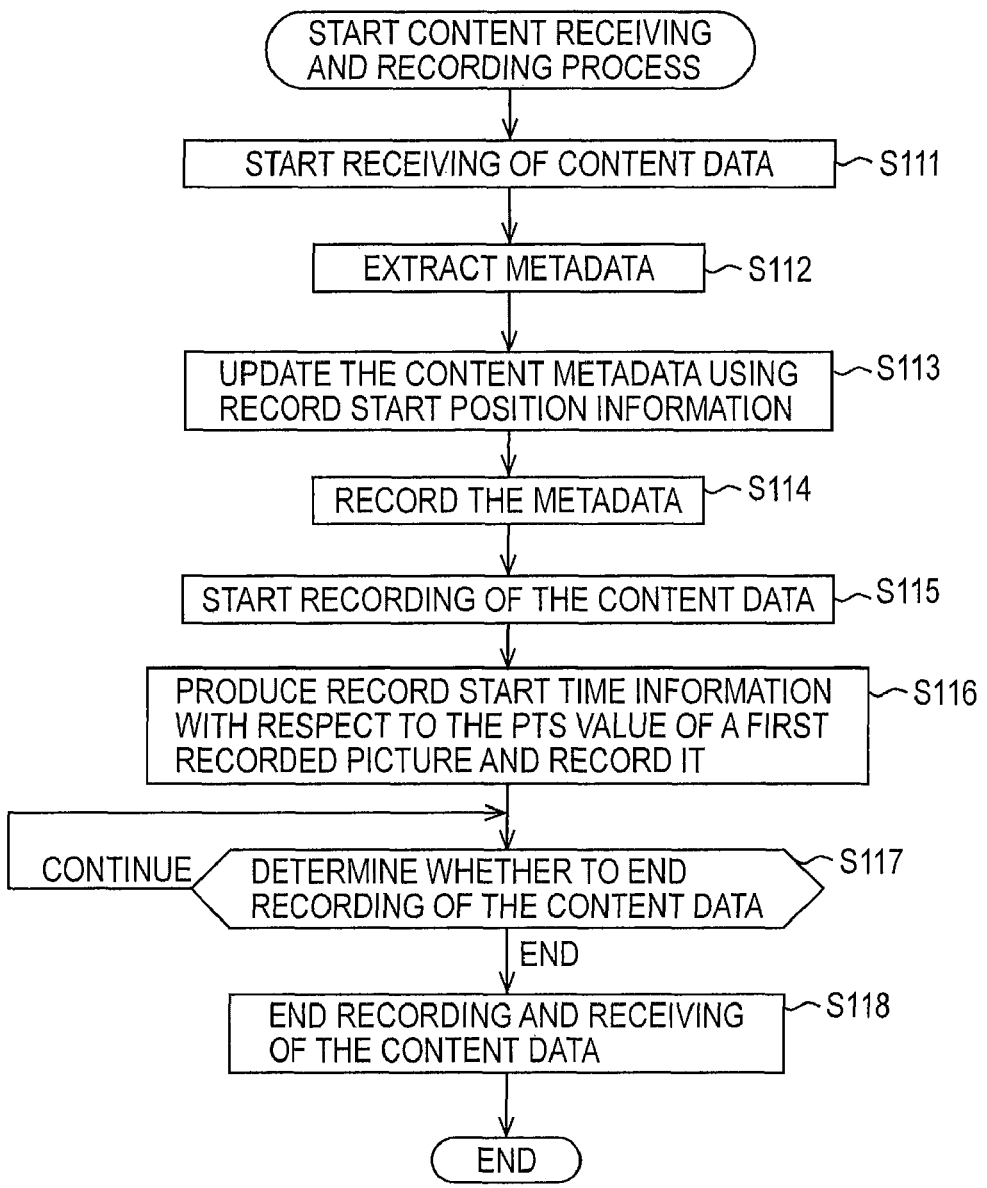
FIG. 21 is a flow chart showing another example of a process of receiving and recording a content.

The process of receiving and recording a content is described further, referring to a flow chart shown in FIG. 21.

In the flow chart shown in FIG. 21, steps S111 to S116 are performed in a similar manner to steps S1 to S6 shown in FIG. 10.

That is, in step S111, as in step S1, the receive controller 91 controls the receiving unit 52 to start receiving content data. In step S112, as in step S2, the write controller 92 controls the demultiplexer 53 to extract metadata from the content data supplied from a broadcast station, and supply it to the metadata manager 101. Note that in this case, the metadata includes the stream playback control table 123 supplied from the broadcast station.

In step S113, as in step S3, the content metadata updating unit 111 updates the content metadata by adding the information indicating the position (record start position) where the start of the content data is recorded when the write controller 92 records the content data in the content data recording unit 54. In step S114, as in step S4, the metadata manager 101 controls the metadata recording unit 96 to record supplied metadata therein. Note that in this case, the metadata recorded by the metadata manager 101 includes the stream playback control table 123 supplied from the broadcast station.

In step S115, as in step S5, the write controller 92 controls the demultiplexer 53 and the content data recording unit 54 to start recording the content data. In step S116, as in step S6, the record start time information generator 112 generates record start time information 142 based on the PTS value of a firstly-recorded picture and stores it in the metadata recording unit 96.

In the process shown in FIG. 21, unlike the process shown in FIG. 10, the system controller 61 does not produce the stream playback control table 123, and thus steps S7 to S9 in the flow chart shown in FIG. 10 are not performed. In step S117, as in step S7, the metadata manager 101 determines whether to end the process of recording the content data. If it is determined that the process of recording the content data should not be ended, the process remains in this step S117 until it is determined that the process of recording the content data should be ended. If it is determined in step S117 that the process of recording the content data should be ended, the metadata manager 101 advances the process to step S118. In step S118, the metadata manager 101 ends the receiving and recording of the content data, and thus content receiving and recording process is completed.

As can be seen from the above description, the content receiving and recording process shown in FIG. 21 is simple than the process shown in FIG. 10. This results in a reduction in the processing load imposed on the system controller 61 during the content receiving and recording process, and thus it becomes possible for the system controller 61 to easily receive a content and record it.

Figure 22:
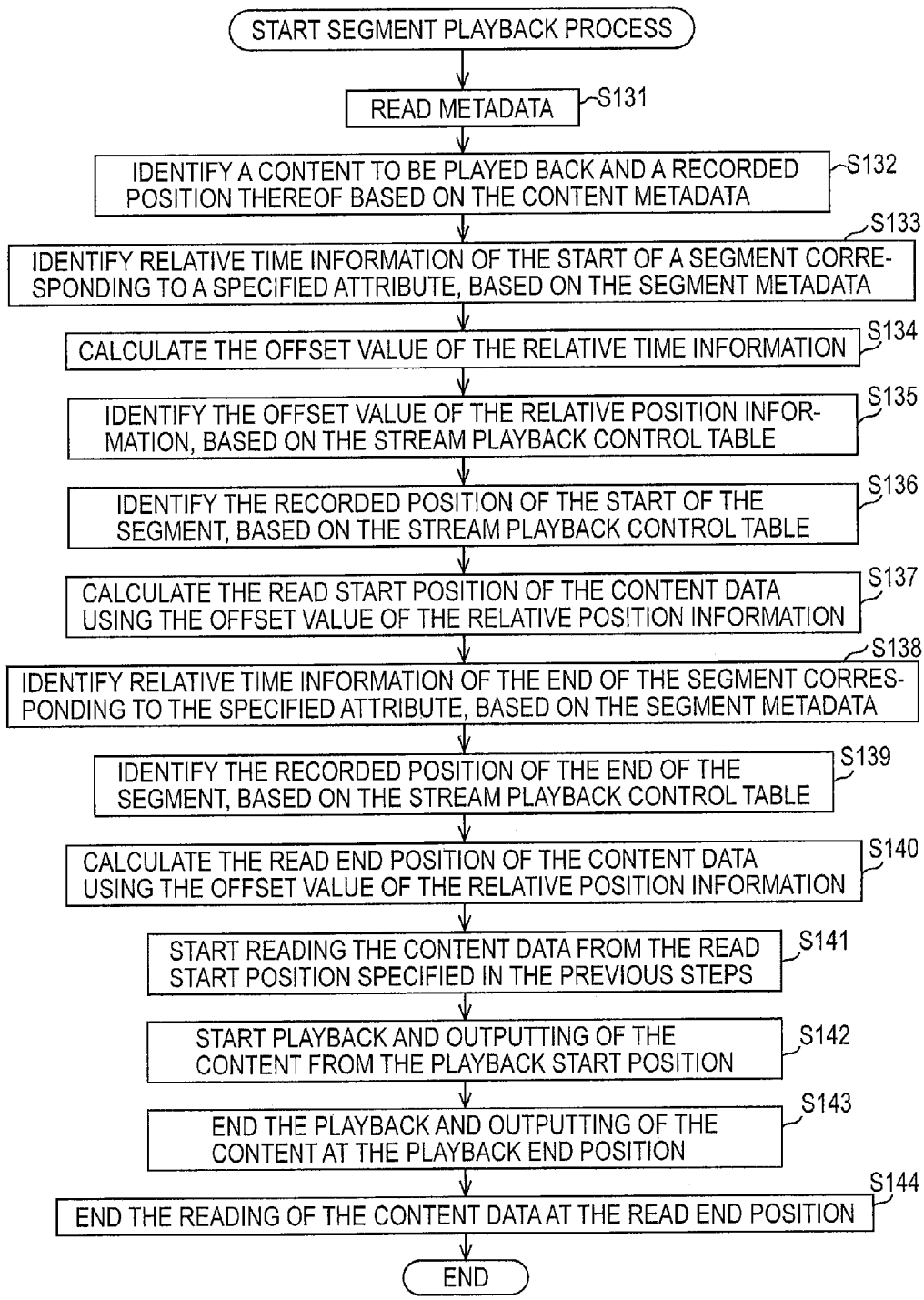
FIG. 22 is a flow chart showing another example of a segment playback process.

A segment playback process is described below with reference to a flow chart shown in FIG. 22. First, in step S131, the metadata manager 101 reads metadata recorded in the metadata recording unit 96.

After the metadata is read, In step S132, the metadata manager 101 identify the content specified by the user to be played back and also identifies the position where the content is recorded, based on the read content metadata. In step S133, the metadata manager 101 further identifies the relative time information (Tsegn) of the start of the segment corresponding to the specified attribute (Asegn), based on the read segment metadata.

In step S134, the offset value calculator 281 calculates the offset value (Tec0) of the relative time information using the content start time information 141 and the record start time information 142. In step S135, the metadata manager 101 identifies the offset value (Drec0) of the relative position information, based on the stream playback control table 123. In step S136, the metadata manager 101 further identifies the record position (Dn) of the start of the specified segment, based on the stream playback control table 123. In step S137, the relative position information correction unit 282 performs a data position correcting process using the offset value of the relative position information to obtain a read start position (Dn_rec) of the content data.

Similarly, in step S138, the metadata manager 101 identifies the relative time information of the end of the segment corresponding to the specified attribute, based on the segment metadata, and in step S139, the metadata manager 101 identifies the record position of the end of the specified segment, based on the stream playback control table 123. In step S140, the relative position information correction unit 282 calculates the read end position of the content data, using the offset value of the relative position information.

If the read start position and the read end position of the content data are determined in the above-described manner, the read controller 93 then controls the demultiplexer 53 and the content data recording unit 54 to start reading the content data from the read start position. The read content data is supplied to the content data playback unit 55.

In step S142, the playback controller 94 controls the content data playback unit 55 to monitor the PTS of the content data supplied from the demultiplexer 53 and start playback of the content from the playback start position (the start of the segment identified in step S133) at which the PTS value is equal to Tsegn+T00. The output controller 95 controls the output unit 56 to output the played-back content. In step S143, the playback controller 94 and the output controller 95 end the playing back and outputting of the content at the playback end position according to the PTS. In step S144, the read controller 93 ends the reading of the content data at the read end position, and ends the segment playback process.

As described above, also in the case in which the stream playback control table 123 is supplied from the broadcast station, by controlling the playback process in the above-described manner, the system controller 61 can exactly identify the start position of the specified segment N can control the playback process in a highly reliable fashion. This makes it possible for the digital broadcast television receiver 31 so as to ensure that a user can view a specified content.

Also in this embodiment, like the embodiment described above with reference to FIGS. 12 to 16, the content data broadcast from the broadcast station may be in an encrypted form. In this case, the system controller 61 is configured to include a read start/end position setting unit 201 as with the system controller shown in FIG. 3, and the read start/end position setting unit 201 controls the read start position and the read end position so as to provide a time equal to or greater than the minimum necessary decoding time Tdcr as shown in FIG. 14.

The method of controlling the process can be applied not only to the decoding process but also to other processes such as a playback process to ensure that processing time becomes equal to or greater than a minimum necessary time thereby ensuring that the processing is performed in a highly reliable manner. In this case, a threshold value by which to determine a process to be performed next may be arbitrarily set. A plurality of threshold values may be set.

In the embodiments described above, it is assumed that a broadcast station provides a terrestrial digital broadcast service to broadcast a program, which is received by digital broadcast television receiver 31. Note that the present invention may also be applied to a broadcast service via cables. Furthermore, the present invention may be applied not only to broadcast but also to multicast or unicast.

Figure 23:
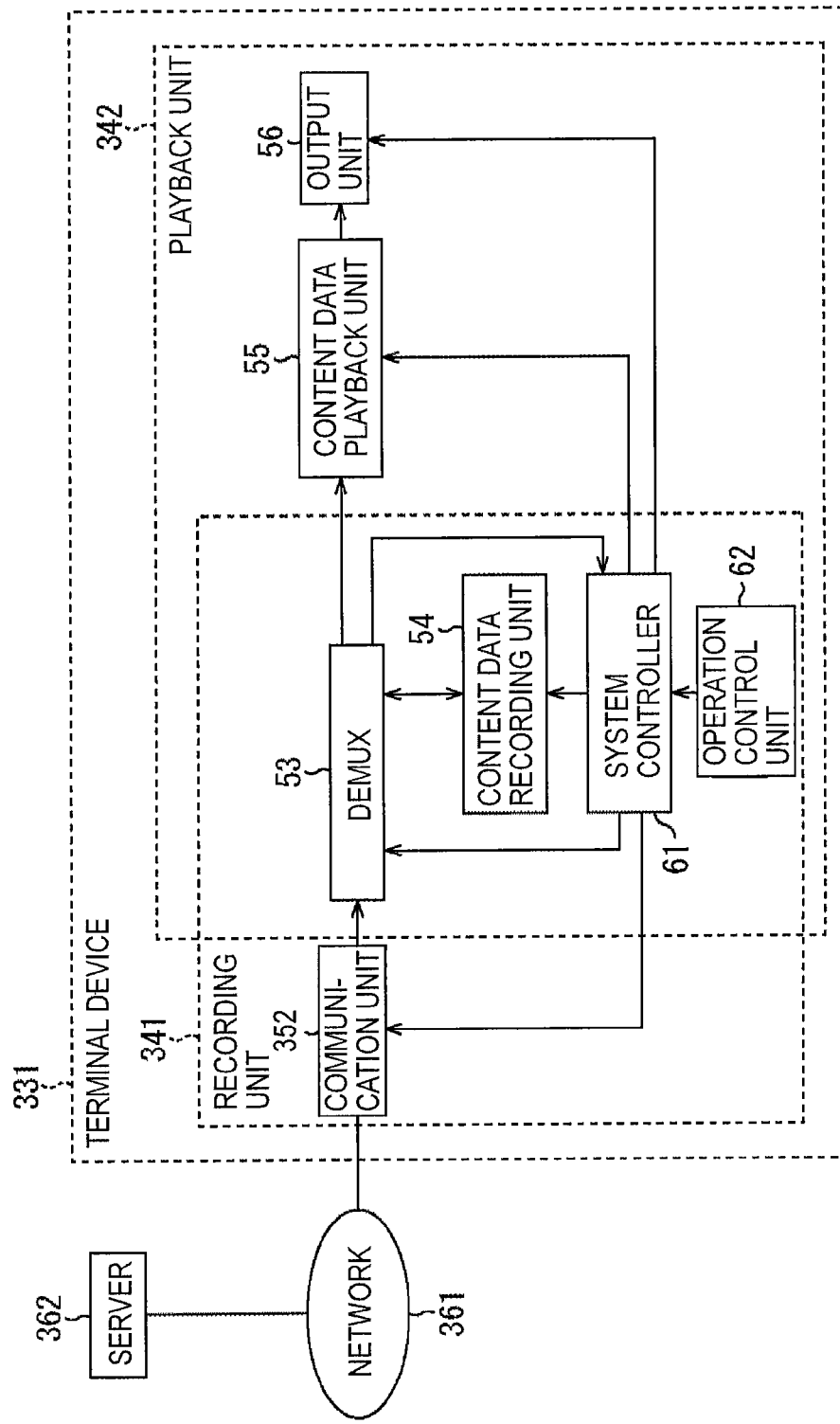
FIG. 23 is a block diagram showing a terminal device according to an embodiment of the invention.

FIG. 23 shows an example of a communication system according to an embodiment of the present invention. In this communication system shown in FIG. 23, a terminal device 331 receives a content transmitted from a server 362 via a network 361 such as the Internet, and the terminal device 331 outputs an image and/or a voice/sound of the content.

As with the digital broadcast television receiver 31, the terminal device 331 includes a recording unit 341 and a playback unit 342. The terminal device 331 is basically similar to the digital broadcast television receiver 31 except that the terminal device 331 includes a communication unit 352 instead of the antenna 51 and the receiving unit 52. That is, the recording unit 341 includes the communication unit 352, a demultiplexer 53, a content data recording unit 54, a system controller 61, and an operation control unit 62. The playback unit 342 includes the demultiplexer 53, the content data recording unit 54, a content data playback unit 55< an output unit 56, the system controller 61, and the operation control unit 62.

Also in this terminal device 331, the system controller 61 performs a similar process to that performed by the system controller 61 of the digital broadcast television receiver 31. However, in the terminal device 331, unlike the digital broadcast television receiver 31 in which the receiving unit 52 receives a television signal, the communication unit 352 communicates with the server 361 to acquire content data. In this communication system configured in the above-described manner, the terminal device 331 can provide great advantages similar to those provided by the digital broadcast television receiver 31.

The server may selectively provide only a segment requested by the terminal device.

Figure 24:
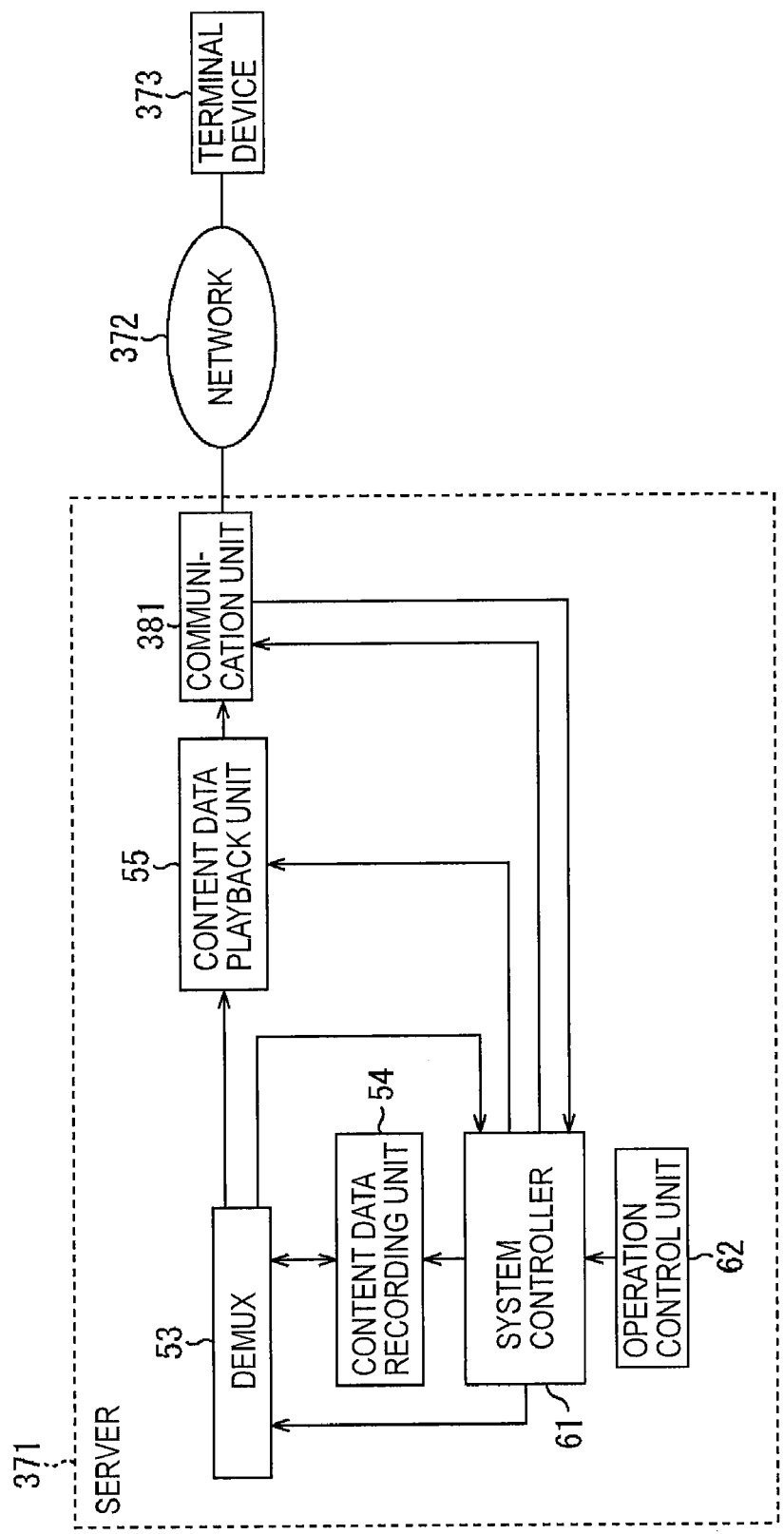
FIG. 24 is a block diagram showing a server according to an embodiment of the present invention.

In this case, as shown in FIG. 24, the server 371 is configured in a similar manner to the playback unit 42 of the digital broadcast television receiver 31 except that the server 371 includes a communication unit 381, connected to the network 372, for communicating with the terminal device 373 instead of the output unit 56 of the digital broadcast television receiver 31. The communication unit 381 communicates with the terminal device 373 via the network 372 to send a request from the terminal device 373 to the system controller 61. In response to receiving the request, under the control of the system controller 61, the communication unit 381 acquires the segment data to be supplied to the terminal device 373 from the content data playback unit 55 and supplies the segment data to the terminal device 373. In the server 371, the content data playback unit 55 may be omitted, and the content data recorded in the compressed form in the content data recording unit 54 may be directly supplied to the terminal device 373.

In this case, the server 371 performs the segment playback process in a similar manner as described above, and thus a further description thereof is omitted herein.

As described above, according to embodiments of the present invention, the television receiver, the terminal device, and/or the server can correctly identify the position of the start of a segment N and can control the playback process according to the identified position. Thus, the television receiver, the terminal device, and/or the server can correctly output a specified content thereby allowing a user to view the exact specified content.

In the embodiments described above, in the digital broadcast television receiver 31 shown in FIG. 3, the recording unit 41 and the playback unit 42 are configured in a single unit. Alternatively, the recording unit 41 and the playback unit 42 may be configured in a separate fashion. A part of the recording unit 41 or the playback unit 42 may be separated from the other parts. The television receiver, the terminal device, and/or the server may each include a plurality of apparatus.

In the broadcast systems or the communication systems described above, only one broadcast, one television receiver, one server, and/or one terminal are shown for the purpose of simplicity. However, there is no particular restriction on the number of these apparatus/devices, and the system usually includes a plurality of these apparatus/devices. The broadcast television signal is not limited to the digital signal, but the broadcast television signal may be in the form of an analog signal.

The sequence of processing steps described above may be performed by means of hardware or software. In this case, for example, the digital broadcast television receiver 31 shown in FIG. 2, the digital broadcast television receiver 181 shown in FIG. 12, the terminal device 331 shown in FIG. 23, and/or the server 371 shown in FIG. 24 may be implemented on a personal computer such as that shown in FIG. 25.

Figure 25:
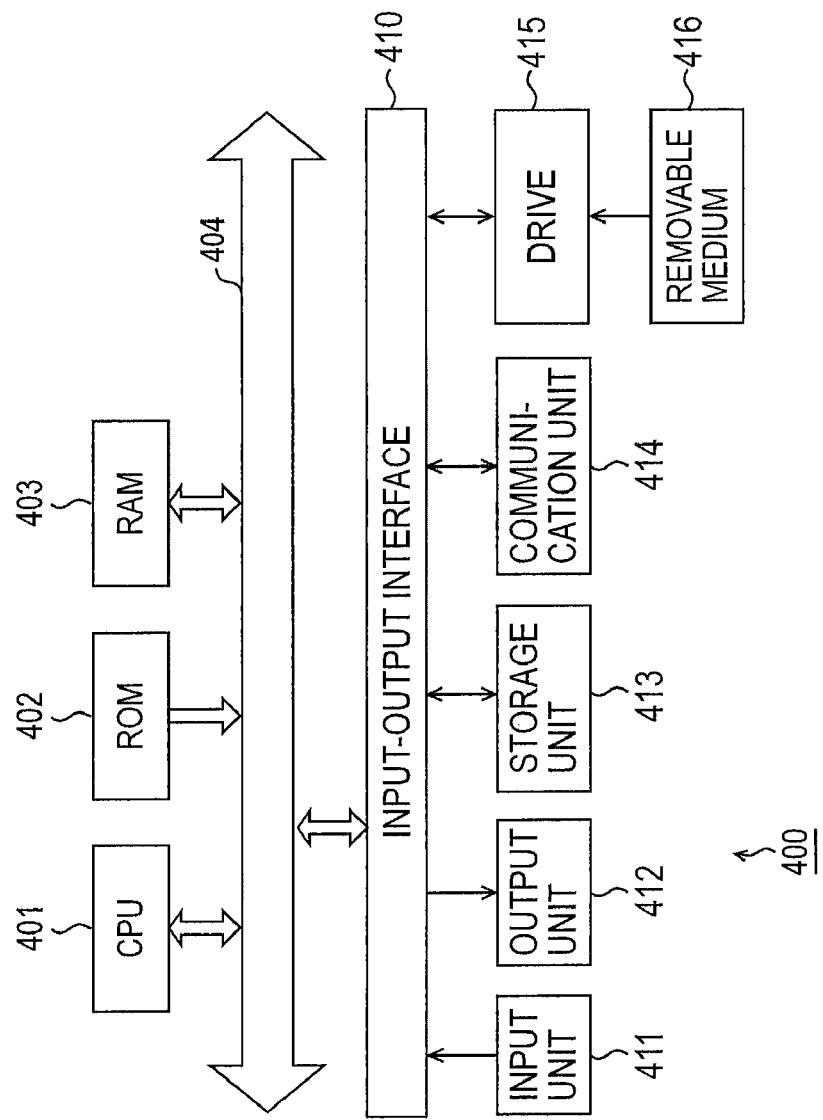
FIG. 25 is a block diagram showing a personal computer according to an embodiment of the present invention.

In FIG. 25, a CPU (Central Processing Unit) 401 of a personal computer 400 performs various processes in accordance with a program stored in a ROM (Read Only Memory) 402 or in accordance with a program loaded into a RAM (Random Access Memory) 403 from a storage unit 413. The RAM 403 is also used to store data used by the CPU 401 in the execution of various processes.

The CPU 401, the ROM 402, and the RAM 403 are connected to each other via a bus 404. The bus 404 is also connected to an input/output interface 410.

The input/output interface 410 is also connected to an input unit 411 including a keyboard, mouse, and the like, an output unit 412 including a display such as a CRT or a LCD and a speaker, a storage unit 413 such as a hard disk, and a communication unit 414 such as a modem. The communication unit 414 serves to perform communication via a network such as the Internet.

Furthermore, the input/output interface 410 is also connected to a drive 415, as required. A removable storage medium 421 such as a magnetic disk, an optical disk, a magnetooptical disk, or a semiconductor memory is mounted on the drive 415 as required, and a computer program is read from the removable storage medium 421 and installed into the storage unit 413, as required.

When the processing sequence is executed by software, a program forming the software may be installed from a storage medium or via a network onto a computer.

An example of such a storage medium usable for the above purpose is a removable medium, such as the removable medium 421 shown in FIG. 25, on which a program is stored and which is supplied to a user separately from a computer. Specific examples include a magnetic disk (such as a floppy disk), an optical disk (such as a CD-ROM (Compact Disk-Read Only Memory) and a DVD (Digital Versatile Disk)), a magnetooptical disk (such as an MD (Mini-Disk, trademark)), and a semiconductor memory. A program may also be supplied to a user by preinstalling it on a built-in ROM 402 or a storage unit 413 such as a hard disk disposed in the computer.

In the present description, the steps described in the program stored in the storage medium may be performed either in time sequence in accordance with the order described in the program or in a parallel or separate fashion.

In the present description, the term "system" is used to describe the whole of a plurality of apparatus.

It should be understood by those skilled in the art that various modifications, combinations, sub-combinations and alterations may occur depending on design requirements and other factors insofar as they are within the scope of the appended claims or the equivalents thereof.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A recording and playback apparatus for recording content data including a content and playing back the content of the content data at a position specified by relative time information indicating a relative time with respect to a start position of the content, the recording and playback apparatus comprising:

first recording means for recording the content data;

record start time information generation means for generating, using reference time information, record start time information indicating time information associated with a record start position of the content data recorded by the first recording means;

second recording means for recording playback control information including content start time information indicating the content start position using the reference time information, the record start time information generated by the record start time information generation means, and a playback control table indicating, for a particular part of the content data recorded by the first recording means, correspondence between the relative time information and first relative position information indicating the amount of data as measured from the start of the content;

playback control information reading means for reading the content start time information, the record start time information, and the playback control table recorded by the second recording means;

offset value calculation means for calculating an offset value to be used in correction of the first relative position information, using the content start time information, the record start time information, and the playback control table read by the playback control information reading means;

identification means for identifying the first relative position information associated with the playback position specified by the relative time information, based on the playback control table read by the playback control information reading means;

relative position information correction means for correcting the first relative position information identified by the identification means, based on the offset value calculated by the offset value calculation means, to acquire the second relative position information indicating the amount of data as measured from the record start position of the content data recorded by the first recording means; and playback means for playing back the content data by reading the content data at the playback position, based on the second relative position information acquired via the correction process performed by the relative position information correction means.

2. A recording and playback method for a recording and playback apparatus to record content data including a content and play back the content of the content data at a position specified by relative time information indicating a relative time with respect to a start position of the content, the method comprising:

recording the content data;

generating, using reference time information, record start time information indicating time information associated with a record start position of the content data;

recording playback control information including content start time information indicating the content start position using the reference time information, the record start time information, and a playback control table indicating, for a particular part of the content data, correspondence between the relative time information and first relative position information indicating the amount of data as measured from the start of the content;

reading the content start time information, the record start time information, and the playback control table;

calculating an offset value to be used in correction of the first relative position information, using the content start time information, the record start time information, and the playback control table;

identifying the first relative position information associated with the playback position specified by the relative time information, based on the playback control table;

correcting the first relative position information, based on the offset value, to acquire the second relative position information indicating the amount of data as measured from the record start position of the content data; and playing back the content data by reading the content data at the playback position, based on the second relative position information.

3. A program embodied on a non-transitory computer readable medium for causing a computer to perform a process of recording content data including a content and playing back the content of the content data at a position specified by relative time information indicating a relative time with respect to a start position of the content, the process comprising:

recording the content data;

generating, using reference time information, record start time information indicating time information associated with a record start position of the content data;

recording playback control information including content start time information indicating the content start position using the reference time information, the record start time information, and a playback control table indicating, for a particular part of the content data, correspondence between the relative time information and first relative position information indicating the amount of data as measured from the start of the content;

reading the content start time information, the record start time information, and the playback control table;

calculating an offset value to be used in correction of the first relative position information, using the content start time information, the record start time information, and the playback control table;

identifying the first relative position information associated with the playback position specified by the relative time information, based on the playback control table;

correcting the first relative position information identified in the identification step, based on the offset value, to acquire the second relative position information indicating the amount of data as measured from the record start position of the content data; and playing back the content data by reading the content data at the playback position, based on the second relative position information.

4. A recording and playback apparatus for recording content data including a content and playing back the content of the content data at a position specified by relative time information indicating a relative time with respect to a start position of the content, the recording and playback apparatus comprising:

a first recording unit configured to record the content data;

a record start time information generation unit configured to generate, using reference time information, record start time information indicating time information associated with a record start position of the content data recorded by the first recording unit;

a second recording unit configured to record playback control information including content start time information indicating the content start position using the reference time information, the record start time information generated by the record start time information generation unit, and a playback control table indicating, for a particular part of the content data recorded by the first recording unit, correspondence between the relative time information and first relative position information indicating the amount of data as measured from the start of the content;

a playback control information reading unit configured to read the content start time information, the record start time information, and the playback control table recorded by the second recording unit;

an offset value calculation unit configured to calculate an offset value to be used in correction of the first relative position information, using the content start time information, the record start time information, and the playback control table read by the playback control information reading unit;

an identification unit configured to identify the first relative position information associated with the playback position specified by the relative time information, based on the playback control table read by the playback control information reading unit;

a relative position information correction unit configured to correct the first relative position information identified by the identification unit, based on the offset value calculated by the offset value calculation unit, to acquire the second relative position information indicating the amount of data as measured from the record start position of the content data recorded by the first recording unit; and a playback unit configured to play back the content data by reading the content data at the playback position, based on the second relative position information acquired via the correction process performed by the relative position information correction unit.

* * * * *